US012360285B2

(12) United States Patent
Mukerji et al.

(10) Patent No.: US 12,360,285 B2
(45) Date of Patent: Jul. 15, 2025

(54) WELL INTERVENTION PERFORMANCE SYSTEM

(71) Applicant: Schlumberger Technology Corporation, Sugar Land, TX (US)

(72) Inventors: Parijat Mukerji, Bucharest (RO); Norbert Walter Hoyer, Lysaker (NO); Glen Lillehammer, Tananger (NO); Ram Kinkar ThaKur, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/552,235

(22) PCT Filed: Mar. 25, 2022

(86) PCT No.: PCT/US2022/071339
§ 371 (c)(1),
(2) Date: Sep. 25, 2023

(87) PCT Pub. No.: WO2022/204718
PCT Pub. Date: Sep. 29, 2022

(65) Prior Publication Data
US 2024/0168195 A1 May 23, 2024

Related U.S. Application Data

(60) Provisional application No. 63/166,105, filed on Mar. 25, 2021.

(51) Int. Cl.
*G01V 20/00* (2024.01)
*E21B 44/00* (2006.01)

(52) U.S. Cl.
CPC .............. *G01V 20/00* (2024.01); *E21B 44/00* (2013.01); *E21B 2200/20* (2020.05)

(58) Field of Classification Search
CPC ..... G01V 20/00; E21B 44/00; E21B 2200/20; E21B 2200/00; E21B 41/00; E21B 43/00
See application file for complete search history.

(56) References Cited

U.S. PATENT DOCUMENTS

| 10,415,349 B2 | 9/2019 | Ranjan et al. |
| 2008/0065362 A1* | 3/2008 | Lee ............................ G01F 1/74 703/10 |
| 2011/0011595 A1* | 1/2011 | Huang .................... E21B 43/00 703/10 |

(Continued)

FOREIGN PATENT DOCUMENTS

| WO | 2020150540 A1 | 7/2020 |
| WO | 2021046356 A1 | 3/2021 |
| WO | 2021230955 A1 | 11/2021 |

OTHER PUBLICATIONS

Search Report and Written Opinion of International Patent Application No. PCT/US2022/071339, dated Jun. 28, 2022.

*Primary Examiner* — Mohamed Charioui
(74) *Attorney, Agent, or Firm* — Jeffrey D. Frantz

(57) ABSTRACT

A method can include receiving inputs for a well; generating scenarios for the well using the inputs; instructing a simulator to simulate generated scenarios; receiving simulation results for at least some of the generated scenarios; and assessing the received simulation results for implementation of one or more well actions for the well.

20 Claims, 27 Drawing Sheets

(56) References Cited

U.S. PATENT DOCUMENTS

| | | | |
|---|---|---|---|
| 2012/0101759 A1 | 4/2012 | Rai et al. | |
| 2014/0303949 A1* | 10/2014 | Boneti | G06Q 10/06 |
| | | | 715/771 |
| 2015/0039281 A1 | 2/2015 | Meyer et al. | |
| 2018/0119534 A1 | 5/2018 | Jamison et al. | |
| 2018/0306016 A1* | 10/2018 | Safonov | C09K 8/60 |
| 2018/0340416 A1 | 11/2018 | Nemoto et al. | |
| 2021/0032965 A1* | 2/2021 | Bridges | E21B 43/16 |
| 2021/0096277 A1* | 4/2021 | Zaki | E21B 47/06 |

\* cited by examiner

WELL INTERVENTION PERFORMANCE SYSTEM

RELATED APPLICATIONS

This application is a National Stage Entry of International Application No. PCT/US2022/071339, filed 25 Mar. 2022, which claims priority to and the benefit of a US Provisional Application having Ser. No. 63/166,105, filed 25 Mar. 2021, which is incorporated by reference herein.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.).

In oil and gas exploration, geoscientists and engineers may acquire and analyze data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc.

SUMMARY

A method can include receiving inputs for a well; generating scenarios for the well using the inputs; instructing a simulator to simulate generated scenarios; receiving simulation results for at least some of the generated scenarios; and assessing the received simulation results for implementation of one or more well actions for the well. A system can include one or more processors; memory accessible to at least one of the one or more processors; processor-executable instructions stored in the memory and executable to instruct the system to: receive inputs for a well; generate scenarios for the well using the inputs; instruct a simulator to simulate generated scenarios; receive simulation results for at least some of the generated scenarios; and assess the received simulation results for implementation of one or more well actions for the well. One or more computer-readable storage media can include processor-executable instructions to instruct a computing system to: receive inputs for a well; generate scenarios for the well using the inputs; instruct a simulator to simulate generated scenarios; receive simulation results for at least some of the generated scenarios; and assess the received simulation results for implementation of one or more well actions for the well. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIGS. 9-24 illustrates an example of a graphical user interface;

DETAILED DESCRIPTION

This description is not to be taken in a limiting sense, but rather is made merely for the purpose of describing the general principles of the implementations. The scope of the described implementations should be ascertained with reference to the issued claims.

Figure 1:
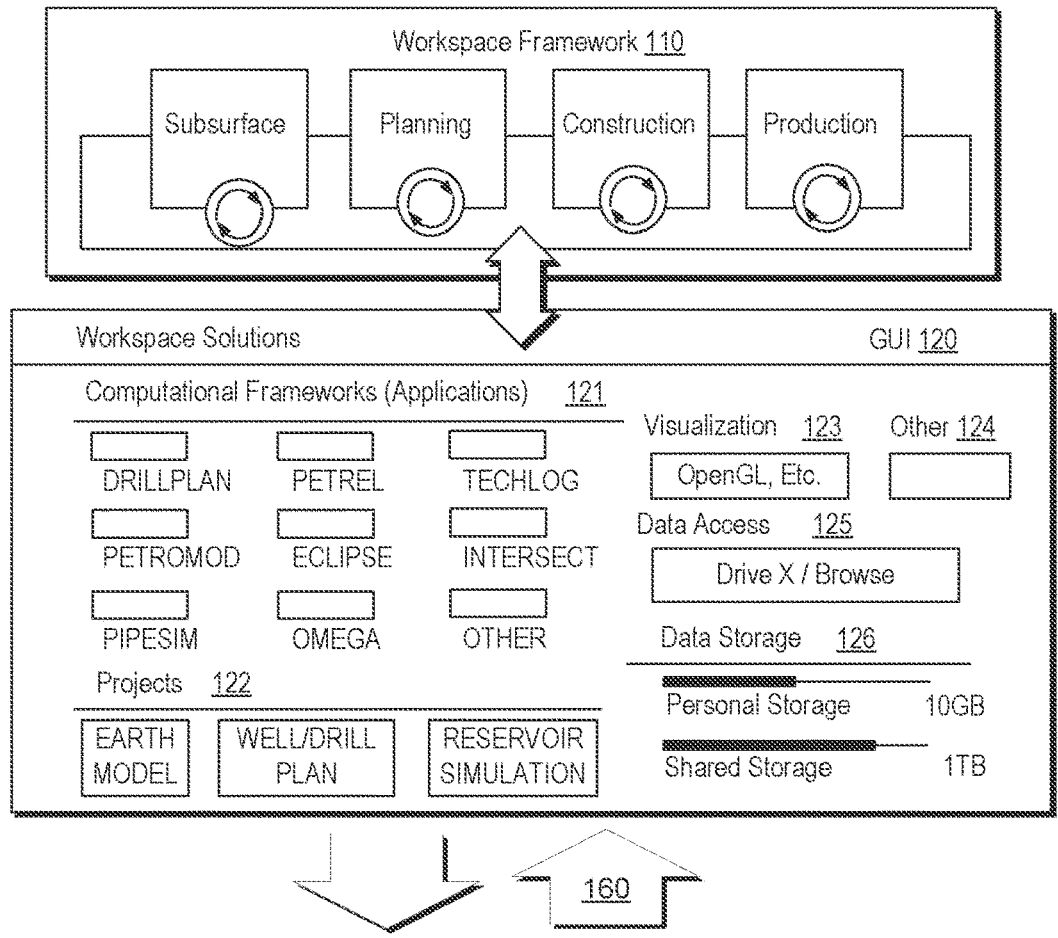
FIG. 1 illustrates an example system that includes various framework components associated with one or more geologic environments.
Figure 1:
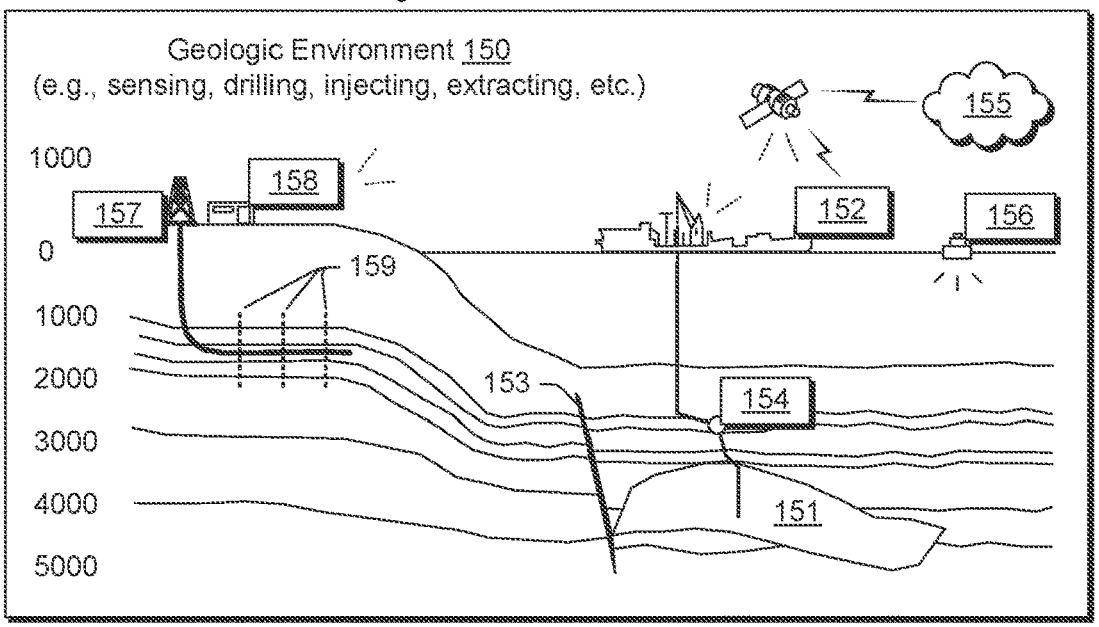

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, INTERSECT, PIPESIM and OMEGA frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive E&P environment (Schlumberger Limited, Houston, Texas) for utilization in geosciences and geoengineering, for example, to analyze subsurface data from exploration to production of fluid from a reservoir.

The TECHLOG framework can handle and process field and laboratory data for a variety of geologic environments (e.g., deepwater exploration, shale, etc.). The TECHLOG framework can structure wellbore data for analyses, planning, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The PIPESIM simulator includes solvers that may provide simulation results such as, for example, multiphase flow results (e.g., from a reservoir to a wellhead and beyond, etc.), flowline and surface facility performance, etc. As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena.

The OMEGA framework includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density. The OMEGA framework also includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools. Various features can be included for processing various types of data such as, for example, one or more of: land, marine, and transition zone data; time and depth data; 2D, 3D, and 4D surveys; isotropic and anisotropic (TTI and VTI) velocity fields; and multicomponent data.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages. Examples of such software packages include the PETREL framework. As an example, a system or systems may utilize a framework such as the DELFI framework (Schlumberger Limited, Houston, Texas). Such a framework may operatively couple various other frameworks to provide for a multi-framework workspace. As an example, the GUI 120 of FIG. 1 may be a GUI of the DELFI framework.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters, rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The MANGROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

As mentioned, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, etc.).

Figure 2:
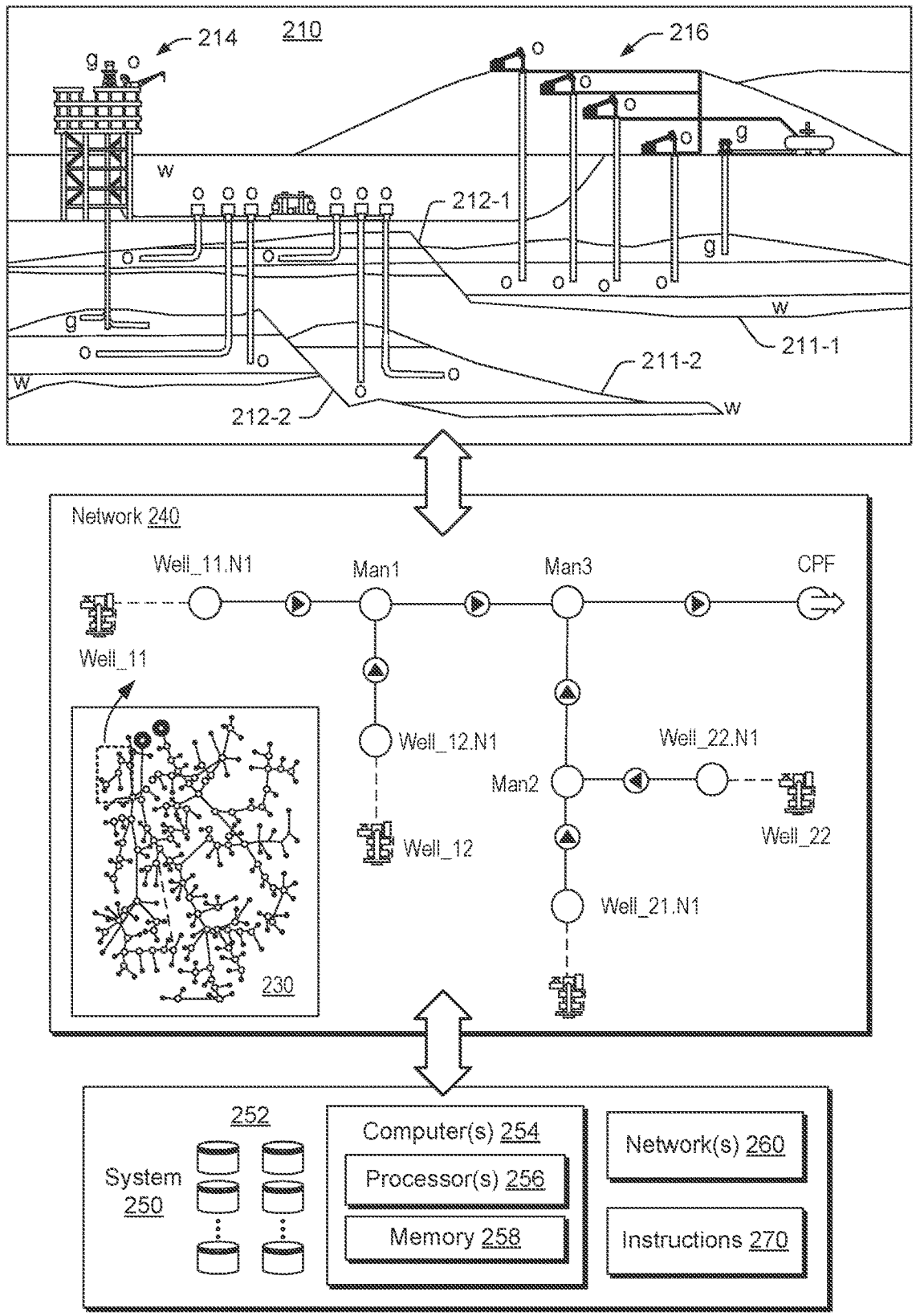
FIG. 2 illustrates examples of equipment in an environment and an example of a computing system.

FIG. 2 shows an example of a geologic environment 210 that includes reservoirs 211-1 and 211-2, which may be faulted by faults 212-1 and 212-2, an example of a network of equipment 230, an enlarged view of a portion of the network of equipment 230, referred to as network 240, and an example of a system 250. FIG. 2 shows some examples of offshore equipment 214 for oil and gas operations related to the reservoir 211-2 and onshore equipment 216 for oil and gas operations related to the reservoir 211-1.

In FIG. 2, the network 240 can be an example of a relatively small production system network. As shown, the network 240 forms somewhat of a tree like structure where flowlines represent branches (e.g., segments) and junctions represent nodes. As shown in FIG. 2, the network 240 provides for transportation of oil and gas fluids from well locations along flowlines interconnected at junctions with final delivery at a central processing facility.

In the example of FIG. 2, various portions of the network 240 may include conduits. For example, consider a perspective view of a geologic environment that includes two conduits which may be a conduit to Man1 and a conduit to Man3 in the network 240.

As shown in FIG. 2, the example system 250 includes one or more information storage devices 252, one or more computers 254, one or more networks 260 and instructions 270 (e.g., organized as one or more sets of instructions). As to the one or more computers 254, each computer may include one or more processors (e.g., or processing cores) 256 and memory 258 for storing the instructions 270 (e.g., one or more sets of instructions), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252. As an example, information that may be stored in one or more of the storage devices 252 may include information about equipment, location of equipment, orientation of equipment, fluid characteristics, etc.

As an example, the instructions 270 can include instructions (e.g., stored in the memory 258) executable by at least one of the one or more processors 256 to instruct the system 250 to perform various actions. As an example, the system 250 may be configured such that the instructions 270 provide for establishing a framework, for example, that can perform network modeling (see, e.g., the PIPESIM framework of the example of FIG. 1, etc.). As an example, one or more methods, techniques, etc. may be performed using one or more sets of instructions, which may be, for example, the instructions 270 of FIG. 2.

As an example, a model may be made that models a geologic environment in combination with equipment, wells, etc. For example, a model may be a flow simulation model for use by a simulator to simulate flow in an oil, gas or oil and gas production system. Such a flow simulation model may include equations, for example, to model multiphase flow from a reservoir to a wellhead, from a wellhead to a reservoir, etc. A flow simulation model may also include equations that account for flowline and surface facility performance, for example, to perform a comprehensive production system analysis.

As an example, a flow simulation model may be a network model that includes various sub-networks specified using nodes, segments, branches, etc. As an example, a flow simulation model may be specified in a manner that provides for modeling of branched segments, multilateral segments, complex completions, intelligent downhole controls, etc. As an example, one or more portions of a production network (e.g., optionally sub-networks, etc.) or a group of signal components and/or controllers may be modeled as sub-models.

As an example, a system may provide for transportation of oil and gas fluids from well locations to processing facilities and may represent a substantial investment in infrastructure with both economic and environmental impact. Simulation of such a system, which may include hundreds or thousands of flow lines and production equipment interconnected at junctions to form a network, can involve multiphase flow science and, for example, use of engineering and mathematical techniques for large systems of equations.

As an example, a flow simulation model may include equations for performing nodal analysis, pressure-volume-temperature (PVT) analysis, gas lift analysis, erosion analysis, corrosion analysis, production analysis, injection analysis, etc. In such an example, one or more analyses may be based, in part, on a simulation of flow in a modeled network.

As to nodal analysis, it may provide for evaluation of well performance, for making decisions as to completions, etc. A nodal analysis may provide for an understanding of behavior of a system and optionally sensitivity of a system (e.g., production, injection, production and injection). For example, a system variable may be selected for investigation and a sensitivity analysis performed. Such an analysis may include plotting inflow and outflow of fluid at a nodal point or nodal points in the system, which may indicate where certain opportunities exist (e.g., for injection, for production, etc.).

A modeling framework may include instructions (e.g., processor-executable instructions) to facilitate generation of a flow simulation model. For example, instructions may provide for modeling completions for vertical wells, completions for horizontal wells, completions for fractured wells, etc. A modeling framework may include instructions for particular types of equations, for example, black-oil equations, equation-of-state (EOS) equations, etc. A modeling framework may include instructions for artificial lift, for example, to model fluid injection, fluid pumping, etc. As an example, consider a set of instructions (e.g., a component) that includes features for modeling one or more electric submersible pumps (ESPs) (e.g., based in part on pump performance curves, motors, cables, etc.).

As an example, an analysis using a flow simulation model may be a network analysis to: identify production bottlenecks and constraints; assess benefits of new wells, additional pipelines, compression systems, etc.; calculate deliverability from field gathering systems; predict pressure and temperature profiles through flow paths; or plan full-field development.

As an example, a flow simulation model may provide for analyses with respect to future times, for example, to allow for optimization of production equipment, injection equipment, etc. As an example, consider an optimal time-based and conditional-event logic representation for daily field development operations that can be used to evaluate drilling of new developmental wells, installing additional processing facilities over time, choke-adjusted wells to meet production and operating limits, shutting in of depleting wells as reservoir conditions decline, etc.

As to equations, sets of conservation equations for mass momentum and energy describing single, two or three phase flow (e.g., according to one or more of a LEDAFLOW™ (Kongsberg Oil & Gas Technologies AS, Sandvika, Norway), OLGA™ model (Schlumberger Ltd, Houston, Texas), TUFFP unified mechanistic models (Tulsa University Fluid Flow Projects, Tulsa, Oklahoma), etc.).

Figure 3:
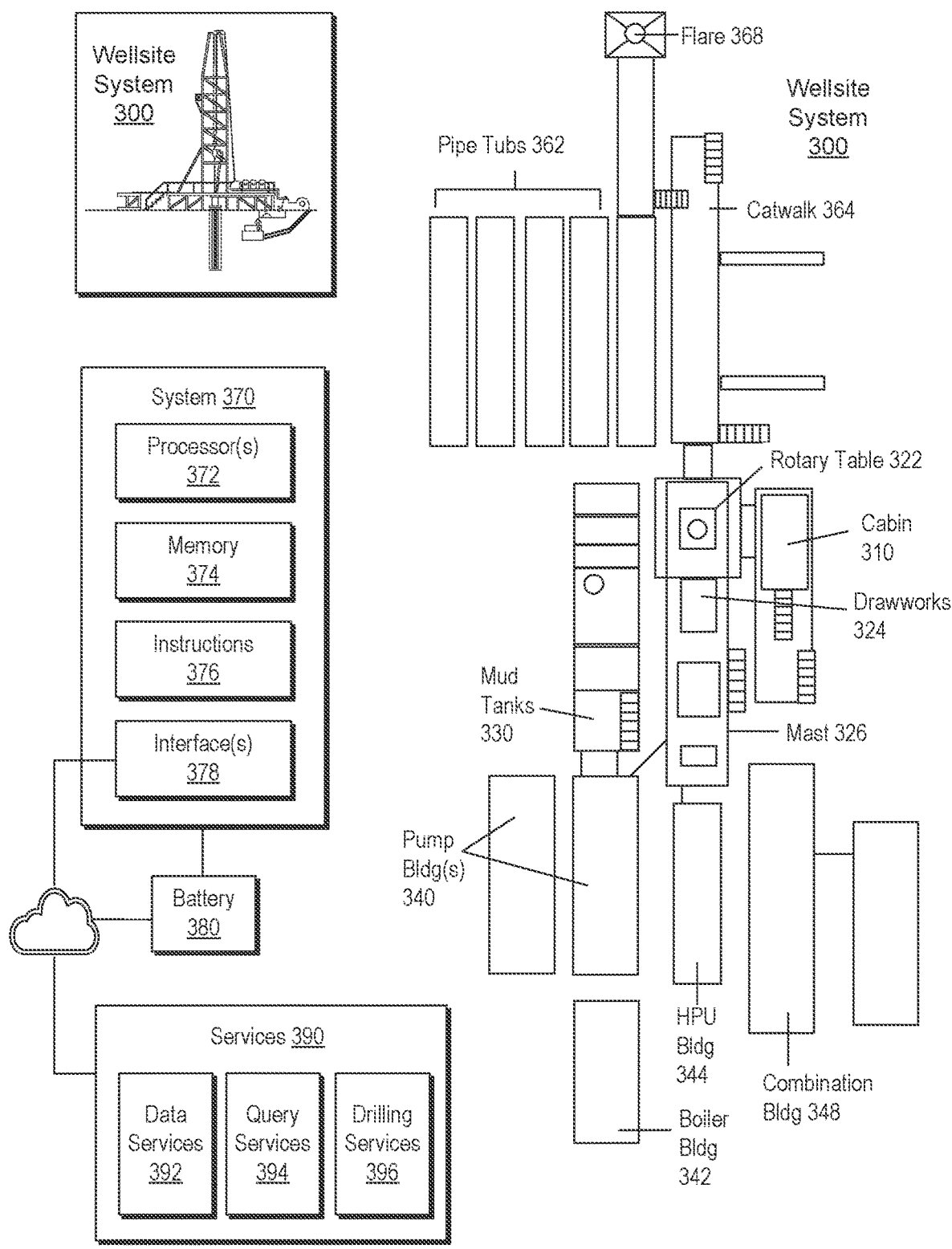
FIG. 3 illustrates an example of a wellsite system and an example of a computing system.

FIG. 3 shows an example of a wellsite system 300, specifically, FIG. 3 shows the wellsite system 300 in an approximate side view and an approximate plan view along with a block diagram of a system 370.

In the example of FIG. 3, the wellsite system 300 can include a cabin 310, a rotary table 322, drawworks 324, a mast 326 (e.g., optionally carrying a top drive, etc.), mud tanks 330 (e.g., with one or more pumps, one or more shakers, etc.), one or more pump buildings 340, a boiler building 342, an HPU building 344 (e.g., with a rig fuel tank, etc.), a combination building 348 (e.g., with one or more generators, etc.), pipe tubs 362, a catwalk 364, a flare 368, etc. Such equipment can include one or more associated functions and/or one or more associated operational risks, which may be risks as to time, resources, and/or humans.

As shown in the example of FIG. 3, the wellsite system 300 can include a system 370 that includes one or more processors 372, memory 374 operatively coupled to at least one of the one or more processors 372, instructions 376 that can be, for example, stored in the memory 374, and one or more interfaces 378. As an example, the system 370 can include one or more processor-readable media that include processor-executable instructions executable by at least one of the one or more processors 372 to cause the system 370 to control one or more aspects of the wellsite system 300. In such an example, the memory 374 can be or include the one or more processor-readable media where the processor-executable instructions can be or include instructions. As an example, a processor-readable medium can be a computer-readable storage medium that is not a signal and that is not a carrier wave (e.g., consider a storage medium that is a storage device).

FIG. 3 also shows a battery 380 that may be operatively coupled to the system 370, for example, to power the system 370. As an example, the battery 380 may be a back-up battery that operates when another power supply is unavailable for powering the system 370. As an example, the battery 380 may be operatively coupled to a network, which may be a cloud network. As an example, the battery 380 can include smart battery circuitry and may be operatively coupled to one or more pieces of equipment via a SMBus or other type of bus.

In the example of FIG. 3, services 390 are shown as being available, for example, via a cloud platform. Such services can include data services 392, query services 394 and drilling services 396.

Figure 4:
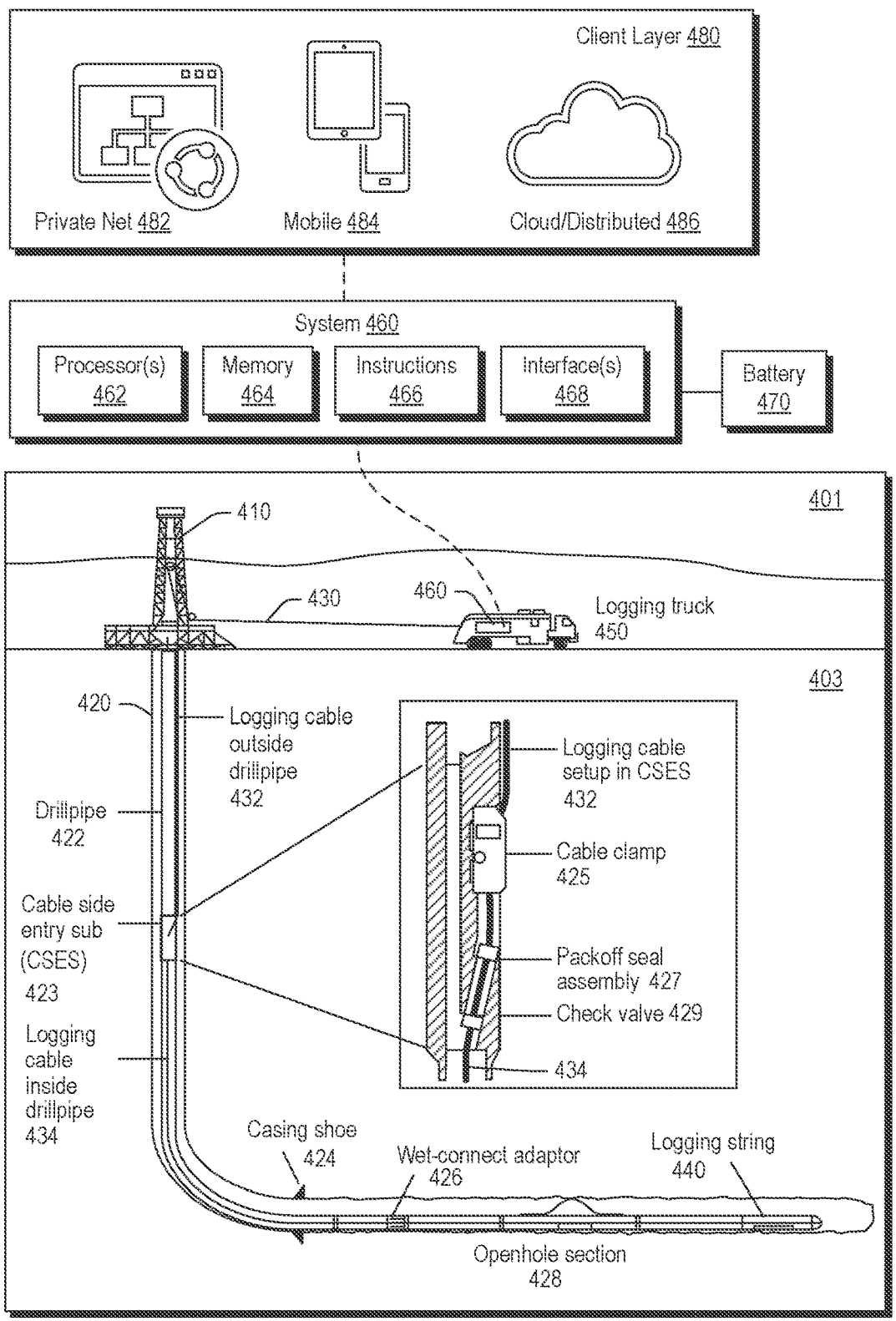
FIG. 4 illustrates examples of equipment and an example of a system.

FIG. 4 shows an example of an environment 401 that includes a subterranean portion 403 where a rig 410 is positioned at a surface location above a bore 420. In the example of FIG. 4, various wirelines services equipment can be operated to perform one or more wirelines services including, for example, acquisition of data from one or more positions within the bore 420.

In the example of FIG. 4, the bore 420 includes drillpipe 422, a casing shoe, a cable side entry sub (CSES) 423, a wet-connector adaptor 426 and an openhole section 428. As an example, the bore 420 can be a vertical bore or a deviated bore where one or more portions of the bore may be vertical and one or more portions of the bore may be deviated, including substantially horizontal.

In the example of FIG. 4, the CSES 423 includes a cable clamp 425, a packoff seal assembly 427 and a check valve 429. These components can provide for insertion of a logging cable 430 that includes a portion 432 that runs outside the drillpipe 422 to be inserted into the drillpipe 422 such that at least a portion 434 of the logging cable runs inside the drillpipe 422. In the example of FIG. 4, the logging cable 430 runs past the wet-connect adaptor 426 and into the openhole section 428 to a logging string 440.

As shown in the example of FIG. 4, a logging truck 450 (e.g., a wirelines services vehicle) can deploy the wireline 430 under control of a system 460. As shown in the example of FIG. 4, the system 460 can include one or more processors 462, memory 464 operatively coupled to at least one of the one or more processors 462, instructions 466 that can be, for example, stored in the memory 464, and one or more interfaces 468. As an example, the system 460 can include one or more processor-readable media that include processor-executable instructions executable by at least one of the one or more processors 462 to cause the system 460 to control one or more aspects of equipment of the logging string 440 and/or the logging truck 450. In such an example, the memory 464 can be or include the one or more processor-readable media where the processor-executable instructions can be or include instructions. As an example, a processor-readable medium can be a computer-readable storage medium that is not a signal and that is not a carrier wave.

FIG. 4 also shows a battery 470 that may be operatively coupled to the system 460, for example, to power the system 460. As an example, the battery 470 may be a back-up battery that operates when another power supply is unavailable for powering the system 460 (e.g., via a generator of the wireline truck 450, a separate generator, a power line, etc.). As an example, the battery 470 may be operatively coupled to a network, which may be a cloud network. As an example, the battery 470 can include smart battery circuitry and may be operatively coupled to one or more pieces of equipment via a SMBus or other type of bus.

As an example, the system 460 can be operatively coupled to a client layer 480. In the example of FIG. 4, the client layer 480 can include features that allow for access and interactions via one or more private networks 482, one or more mobile platforms and/or mobile networks 484 and via the "cloud" 486, which may be considered to include distributed equipment that forms a network such as a network of networks. As an example, the system 460 can include circuitry to establish a plurality of connections (e.g., sessions). As an example, connections may be via one or more types of networks. As an example, connections may be client-server types of connections where the system 460 operates as a server in a client-server architecture. For example, clients may log-in to the system 460 where multiple clients may be handled, optionally simultaneously.

FIGS. 1, 2, 3 and 4 show various examples of equipment in various examples of environments. As an example, one or more workflows may be implemented to perform operations using equipment in one or more environments. As an example, a workflow may aim to understand an environment, for example, to understand physical phenomena in the environment, structural features in the environment, locations of hydrocarbons, etc. As an example, a workflow may aim to drill into an environment, for example, to form a bore defined by surrounding earth (e.g., rock, fluids, etc.). As an example, a workflow may aim to support a bore, for example, via casing. As an example, a workflow may aim to fracture an environment, for example, via injection of fluid. As an example, a workflow may aim to produce fluids from an environment via a bore. As an example, a workflow may utilize one or more frameworks that operate at least in part via a computer (e.g., a computing device, a computing system, etc.).

In various operations, fluid transport occurs, which may be in a subsurface region, in a region below a water-air interface (e.g., on a seabed, between a seabed and water-air interface, etc.), and/or above ground. Fluid transport can give rise to various issues. For example, when oil, water, and gas simultaneously flow in a well or pipeline, various types of problems can arise. For example, consider problems that may be related to flow instabilities, solids formation that may potentially block a flowpath, erosion and corrosion that may potentially result in pipeline ruptures, etc.

The aforementioned PIPESIM framework may be utilized for simulation of single and/or multiphase flow. Such a framework may be implemented in one or more types of workflows such as a workflow for system design, a workflow for production operations, etc. The PIPESIM framework may be utilized to identify situations that demand more detailed simulation, for example, using the OLGA multiphase flow simulator. In various instances, a simulation may be a steady-state simulation or a transient simulation (e.g., with or without one or more steady-states, etc.). As to some examples of transient scenarios, consider one or more of shut-in, startup, ramp-up, terrain-induced slugging, severe slugging, slug tracking, hydrate kinetics and wellbore cleanup. As an example, a workflow can include implementing the PIPESIM framework and one or more instances of an OLGA simulator. As an example, a method may include characterizing fluid behavior using one or more models (e.g., black-oil models, compositional fluid models, etc.).

As to flow assurance workflows, consider tasks such as pipeline and facility sizing. As an example, a workflow may aim to size pipelines to minimize backpressure while maintaining stable flow within a maximum allowable operating pressure (MAOP). As an example, a workflow may aim to size pumps, compressors, and multiphase boosters to meet target rates. As an example, a workflow may provide for assessment of system-design layout options and operating parameters for a range of inputs. As an example, a workflow may provide for sizing separation equipment and slug catchers to manage liquids associated with pigging, ramp-up surges, and hydrodynamic slugging volumes. As an example, a workflow may aim to aid design and/or optimization of one or more pipelines and equipment such as pumps, compressors, and multiphase boosters to maximize production and capital investment. As an example, a workflow may include calculating one or more burial depths and/or insulation types, thicknesses, etc., for pipelines.

As to well performance, a workflow may include performing nodal analysis and diagnosing liquid loading or lift requirements. In various scenarios, artificial lift may be considered where a workflow may assess viability of an artificial lift strategy, equipment, etc. A workflow may provide for design of one or more artificial lift systems (e.g., rod pumps, progressive cavity pumps, ESPs, and gas lift) and compare their relative benefits. A workflow may include assessing production through intelligent completions, for example, by modeling downhole flow control valves and/or other downhole equipment, such as, for example, chokes, subsurface safety valves, separators, and chemical injectors.

As an example, a workflow may aid in assessing completion design, for example, by considering skin effects on horizontal well length and tubing and/or casing size. In various scenarios, a workflow may provide for modeling multilaterals and/or wells with multiple layers and crossflow.

As to liquids management, a workflow may provide for one or more of identification of risk for severe riser slugging, accounting for emulsion formation, assessing operational risk from deposition of wax along flowlines over time, etc.

As to integrity, a workflow may aim to identify locations prone to corrosion and/or predict CO2 corrosion rates. As an example, a workflow may utilize one or more American Petroleum Institute (API) techniques, Salama techniques, etc., for example, as to erosion.

As to solids management, a workflow may include identifying risks of potential solids formation including wax, hydrates, asphaltenes, and scale, assessing risk from deposition of wax along flowlines over time. As an example, a workflow can include determining an amount of methanol to inject to avoid hydrate formation.

Figure 5:
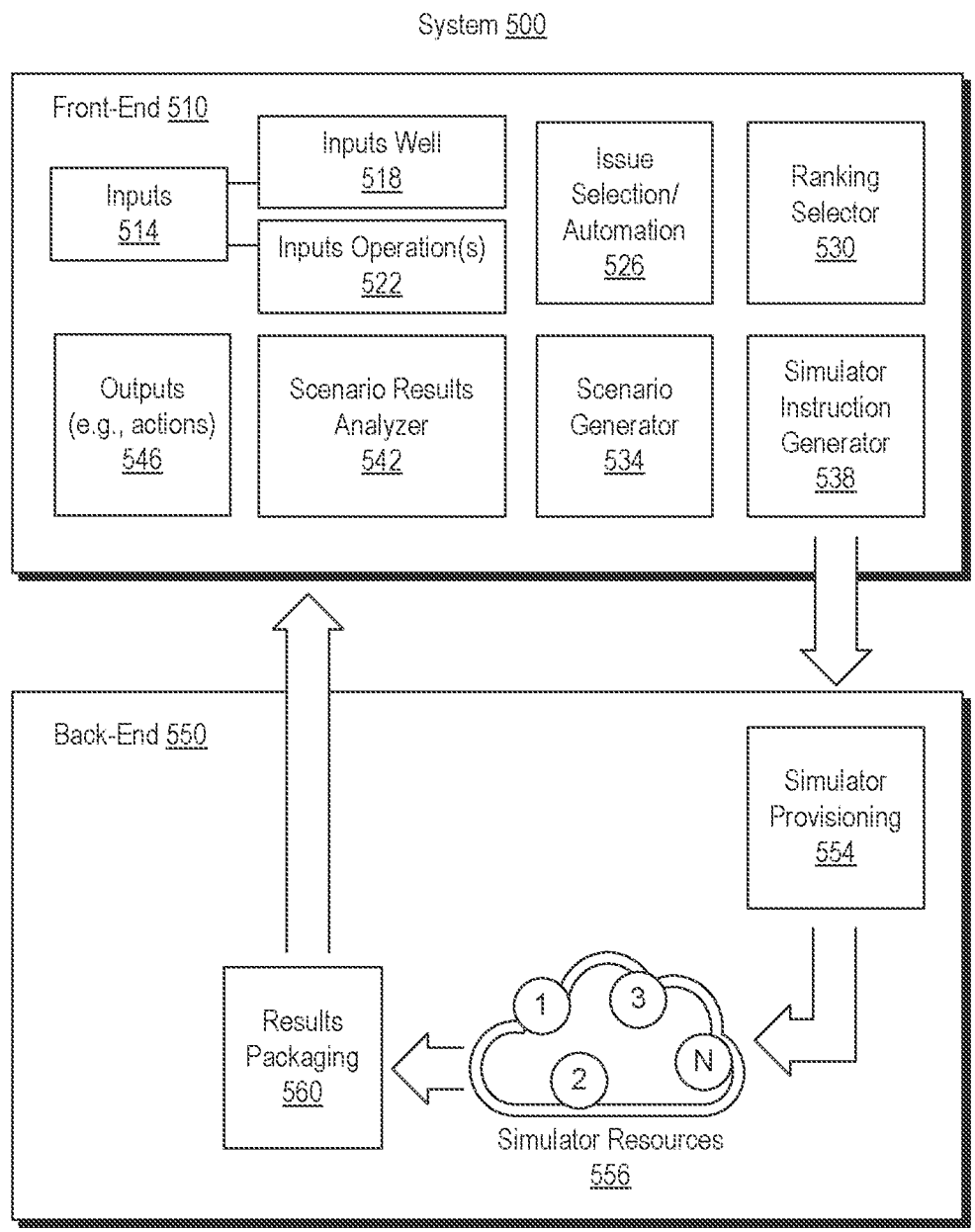
FIG. 5 illustrates an example of a system.

FIG. 5 shows an example of a system 500 that includes a front-end 510 and a back-end 550. In the example of FIG. 5, the front-end 510 can interact with the back-end 550 where the front-end 510 may provide for expediting one or more workflows.

As shown in the example of FIG. 5, the front-end 510 can include an input block 514 for inputs, which may include inputs for a well 518 and inputs for one or more operations 522. The front-end 510 may include one or more of an issue selection and/or automation block 526, a ranking selector block 530, a scenario generator block 534, a simulator instruction generator block 538, a scenario results analyzer 542 and an output block 546 for outputting one or more outputs (e.g., instructions for action, actions, etc.).

In the example of FIG. 5, the back-end 550 can include a simulator provisioning block 554, simulator resources 556 and a results packaging block 560, for example, to package results from one or more simulators for transmission to the front-end 510. As shown, the simulator resources 556 may be cloud-based types of resources that may be appropriately provisioned, for example, to provide for appropriate handling of the simulator instructions issued by the simulator instruction generator block 538 of the front-end 510. For example, the provisioning block 554 may provision resources for multiple instances of a simulator, which may be on a one-to-one basis with scenarios of the scenario generator 534.

As an example, scenarios may be tailored to one or more criteria such as, for example, one or more convergence criteria that can increase a likelihood that a simulation run convergences and/or converges within a particular amount of time. For example, where one scenario is expected to take more than 2 or 3 times longer to simulate than another scenario, an alarm may be issued such that a user can be aware of the differences in time to simulate and/or a user may specify an amount of time such that results are available within that amount of time, whether through tailoring and/or through provisioning of simulator resources.

Figure 6:
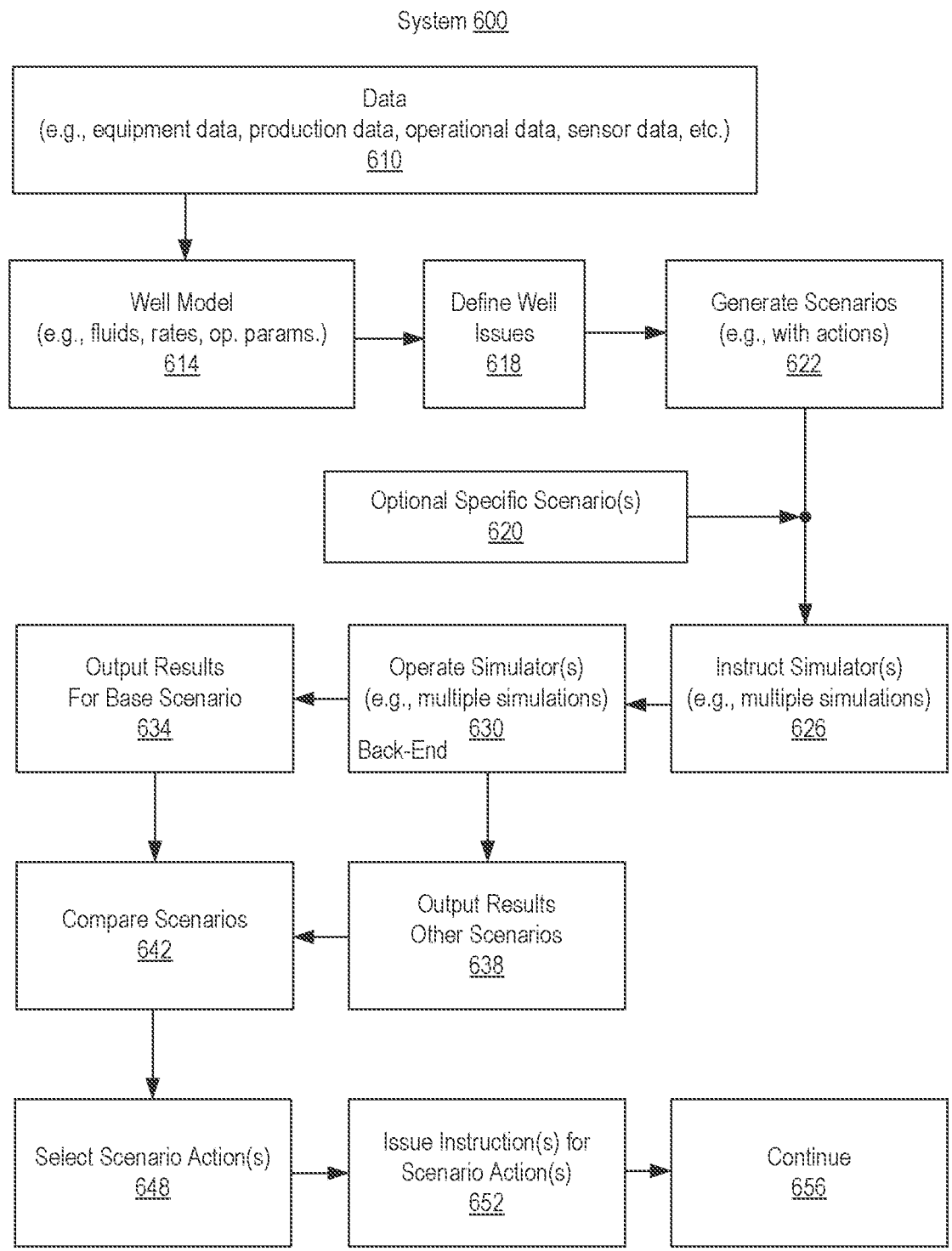
FIG. 6 illustrates an example of a system.

FIG. 6 shows an example of a system 600 that includes various components and/or actions illustrated as blocks. As shown, the system 600 may operate in a logical manner, for example, according to one or more methods, workflows, etc. As shown, the system 600 includes a data block 610 that can acquire, receive, provide, etc., one or more types of data (e.g., equipment data, production data, operational data, sensor data, etc.). Such data can be utilized in a well model block 614, which may provide for specification of fluids, rates, operational parameters, etc. As shown, the data block 610 and the well model block 614 can provide information for defining one or more well issues, for example, in a well issue definition block 618. With one or more well issues defined, the system 600 can generate one or more scenarios per a generation block 622 where a scenario may be expected to provide guidance as to addressing, avoiding, etc., at least one of the one or more well issues.

In the example of FIG. 6, the system 600 can include various features of the front-end 510 of FIG. 5. As explained, a system can receive input and generate scenarios, which may be defined by one or more actions. Such generated scenarios can expedite one or more workflows, which may be for one or more purposes. In various instances, an issue may be urgent and the generated scenarios can be created in a more expeditious manner than a human. As an example, the generation of scenarios may occur automatically, for example, responsive to data, an alarm, etc.

As shown in FIG. 6, the system 600 can include a specific scenario block 620, which may be optional and available for use to include one or more specific scenarios in addition to the generated scenarios and/or as an alternative or alternatives to one or more of the generated scenarios. For example, consider the front-end 510 of FIG. 5 as including a graphical user interface (GUI) that allows a user to review generated scenarios and to add, revise, substitute, delete, etc. Such an approach to review, revision, addition, substitution, deletion, etc., may occur prior to instruction of one or more simulators. In various examples, scenarios can include a base scenario, which may, for example, correspond to a current scenario for a well or an intended scenario to be implemented for a well. Where a base scenario is included, other scenarios may be generated that can be for other courses of action, which may prove to be better or worse than the base scenario.

In the example of FIG. 6, an instruct simulator(s) block 626 can provide for instructing one or more simulators based on generated and/or specific scenarios per the blocks 622 and 620. The block 626 may be part of a front-end that transmits instructions to a back-end. As shown, an operate simulator(s) block 630 of the system 600 can be a back-end block that can provide for the operation of one or more simulators to perform one or more simulations. As shown, results from the operation of the one or more simulators (e.g., via a back-end, cloud-based resources, etc.) can be transmitted to one or more output blocks 634 and 638, where the block 634 can be results for a base scenario (e.g., a base case, if present) and where the block 638 can be results for other scenarios.

In the example of FIG. 6, a comparison block 642 is provided where results can be compared, for example, whether a base scenario to one or more others or between scenarios without a base scenario. As shown, the comparison block 642 can provide information to a selection block 648 that may be utilized to select a scenario and one or more corresponding actions as associated with that scenario. Where a scenario action or actions are selected, an issuance block 652 can provide for issuing an instruction or instructions for the scenario action or actions. For example, an instruction may be a control instruction that is received by wellsite equipment such that an action occurs at the wellsite, whether at surface, underwater, below surface, etc.

Where the system 600 operates during an ongoing phase, the system 600 can continue operating per a continuation block 656, which may return to the data block 610, the well model block 614, the definition block 618, etc., such that one or more scenarios can be generated per the generation block 622 (e.g., and/or the block 620) for instructing one or more simulators per the instruction block 626. In such an approach, the system 600 may operate to continuously address issues and/or otherwise improve wellsite operations.

Figure 7:
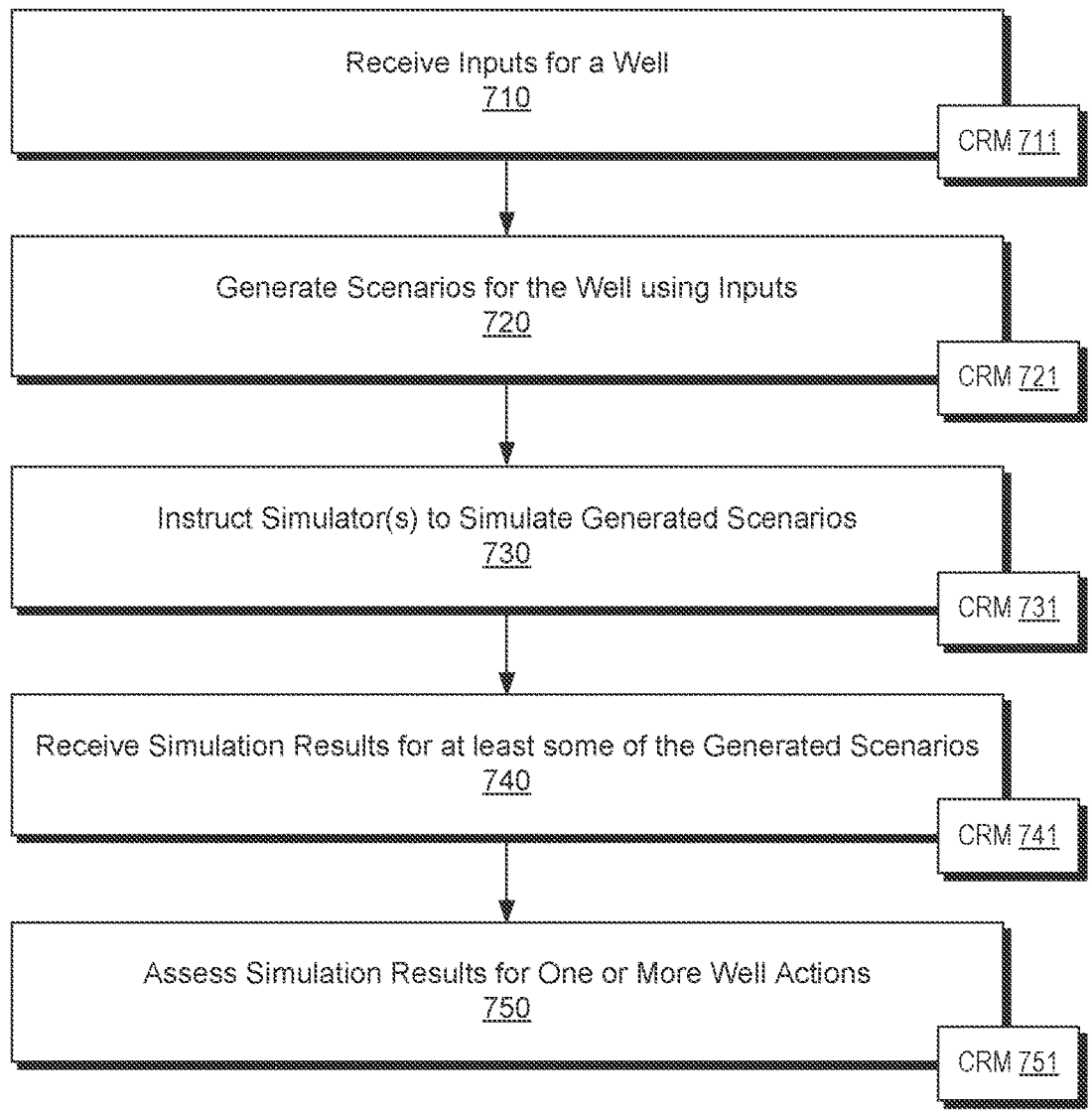
FIG. 7 illustrates an example of a method and an example of a computing system.
Figure 7:
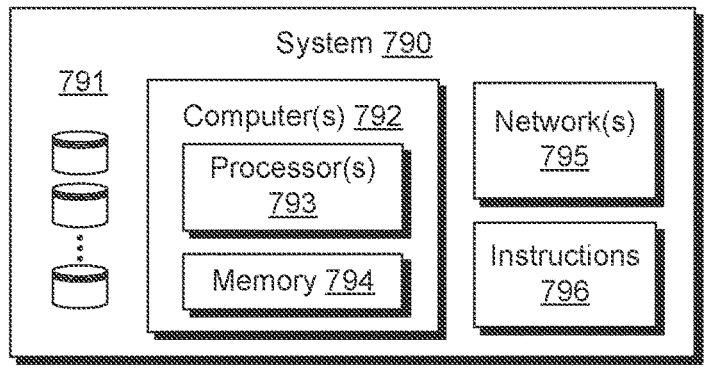

FIG. 7 shows an example of a method 700 that includes a reception block 710 for receiving inputs for a well; a generation block 720 for generating scenarios for the well using the inputs; an instruction block 730 for instructing a simulator to simulate generated scenarios; a reception block 740 for receiving simulation results for at least some of the generated scenarios; and an assessment block 750 for assessing the received simulation results for implementation of one or more well actions for the well. As an example, the method 700 may be performed using one or more features of the system 500 of FIG. 5 and/or the system 600 of FIG. 6. As an example, the method 700 may be implemented by a front-end that instructs a back-end, for example, as illustrated in FIG. 5 and/or FIG. 6.

The method 700 is shown in FIG. 7 in association with various computer-readable media (CRM) blocks 711, 721, 731, 741 and 751. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 700. As an example, a computer-readable medium (CRM) may be a computer-readable storage medium that is non-transitory and that is not a carrier wave. As an example, one or more of the blocks 711, 721, 731, 741 and 751 may be in the form of processor-executable instructions.

In the example of FIG. 7, a system 790 includes one or more information storage devices 791, one or more computers 792, one or more networks 795 and instructions 796. As to the one or more computers 792, each computer may include one or more processors (e.g., or processing cores) 793 and memory 794 for storing the instructions 796, for example, executable by at least one of the one or more processors 793 (see, e.g., the blocks 711, 721, 731, 741 and 751). As an example, a computer may include one or more network interfaces (e.g., wired or wireless), one or more graphics cards, a display interface (e.g., wired or wireless), etc.

Figure 8:
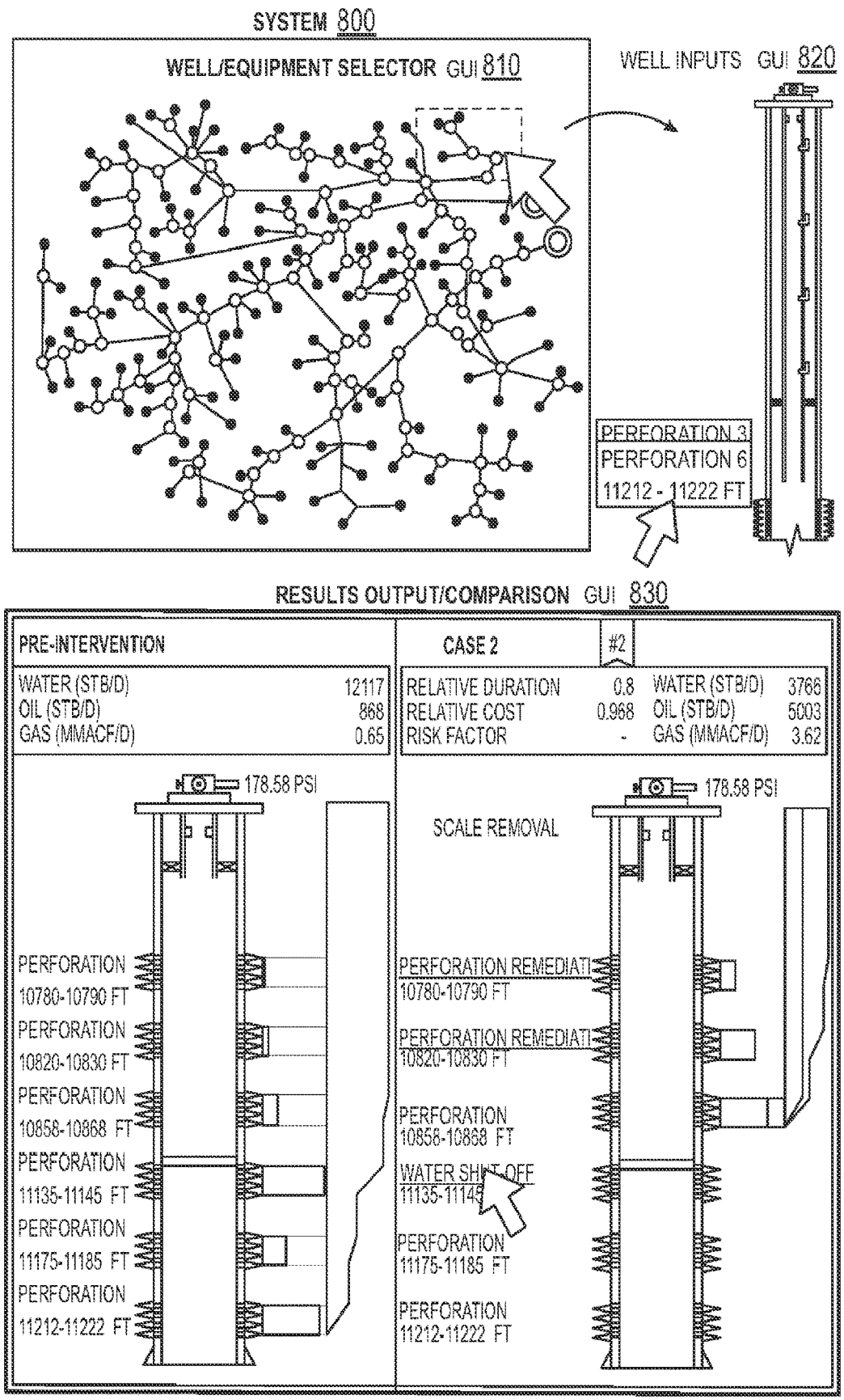
FIG. 8 illustrates an example of a system and examples of graphical user interfaces (GUIs)

FIG. 8 shows an example of a system 800 that includes instructions executable for rendering one or more graphical user interfaces (GUIs) 810, 820 and 830. As shown, the GUI 810 can include a graphical view of a network of equipment that includes wells and associated equipment. In such an example, a user may interact with the GUI 810 (e.g., via touch, a human input device (HID), voice, etc.) to select a portion of the network and, for example, to select a well.

As shown in FIG. 8, a representation of the selected well may be rendered using the GUI 820. The selected well may be a vertical well or a deviated well (e.g., a lateral, a horizontal, etc.) where the GUI 820 may include options for rendering a representation accurately or approximately. For example, the representation in the GUI 820 shows a vertical rendering though the actual selected well may be curved with a horizontal portion. In the example GUI 820, one or more features of the well may be represented and optionally be selectable. For example, consider selecting a feature such as a perforation where the perforation may be a feature of the selected well or a feature to be created through one or more actions to be performed on the selected well (e.g., a perforation action, etc.).

As to the GUI or GUIs 830, a pre-intervention visualization is shown and a "Case 2" proposed intervention visualization is shown, where they may be shown in a side by side manner for comparison. In the examples of FIG. 8, colors can indicate different fluids and/or fluid compositions. For example, consider water being blue, oil being green and gas being red. In the pre-intervention visualization, a production graphic is predominantly blue, whereas, for Case 2, the production graphic is predominantly green. In the example of FIG. 8, numeric values are also shown to indicate that oil production via the proposed intervention can be increased while water production is decreased. In the example of FIG. 8, the intervention can be associated with one or more downhole actions pertaining to flow. For example, consider perforation actions, packer actions, etc. As shown, the intervention involves adjusting equipment such that fluid is produced from perforations at lesser measured depth while flow is blocked from various perforations at deeper measured depth (see, e.g., measured depth in feet). Such an approach allows a user to readily visualize and confirm numerically the impact on production for implementation of the intervention of Case 2 (e.g., via simulation results).

As an example, a system can be a well intervention performance system. For example, a system can provide for performance measures such as one or more actions that can increase performance of a well. As an example, a system may be operable automatically or semi-automatically (e.g., as may be driven by data, inputs via a GUI, etc.). As an example, an automated workflow can provide for a technical evaluation and performance-based ranking of possible intervention actions. As an example, an advisory system can provide simulation-based insights to expedite evaluation and/or comparison of one or more possible intervention methods for a given well. In various examples, one or more scenarios may link to a well opportunity maturation framework, for example, to assess, operate, etc., one or more wells as they mature.

As explained with respect to the systems 500 and 600 of FIGS. 5 and 6, an operator may make rapid decisions to intervene one or more well candidate scenarios in an optimal way to maximize production.

As an example, a system can provide a user guided automated workflow that involves a few user inputs/interactions to build up a simulation-based intervention proposal for a given well.

As an example, a workflow can start with a generic well model that can describe a well base case model. For example, consider a well model that can account for tubulars, deviation surveys, downhole equipment, artificial lift equipment and/or techniques, reservoir fluids, pressures, temperature and inflow rates, etc. of completions, etc. As an example, a workflow can include tuning a generated well model against one or more available measurements from the field (e.g., field data as may be acquired by sensors, etc.).

As an example, an operator may interact with a system to define one or more well problems and risks and, for example, operational parameters of the well model to describe one or more issues and/or one or more challenges.

Given various inputs, a system can automatically create various possible opportunities (e.g., including available actions) for the well model in a manner that can be based on domain knowledge and logic of the given problems and risks.

As explained, scenarios can be simulated via instructing one or more simulators where simulation results can provide insights into performance of the well. As an example, simulated opportunities can be ranked, for example, consider ranking in order of the largest hydrocarbon gain to indicate the best production improvement.

In various instances, a system can provide for rendering various opportunities, for example, including a pre-intervention case. Such renderings (e.g., visualizations) may be rendered to one or more displays as one or more graphical user interfaces (GUIs). As an example, a visualization or visualizations can be provided in a GUI or GUIs for making comparisons and/or designs, which may provide for further analysis and/or selection of one or more intervention candidate(s) for the well.

As explained, a system can include features that provide an option to create one or more custom cases (e.g., what-if scenarios, etc.) that may further enrich and augment an analysis of potential interventions. Such features may be included, for example, in a compare and design component or other component of a system.

As an example, a system can operate to output or otherwise indicate one or more of the most promising candidates, for example, based on flow assurance insights, which can include predicted performance. As an example, output may be in the form of one or more instructions as to one or more actions, as one or more proposals, as one or more plans, etc.

As explained, a system can be a well performance advising system that can generate actions that may be implemented. Such a system can provide for increased automation of a workflow that may otherwise be in the hands of domain experts, which perform tasks manually (e.g., manual set up of an individual simulation on a best estimate of what may improve well performance, etc.).

As explained, a system can provide for increased workflow automation, which may be utilized by various types of operators of various skill levels. For example, an operator may not have knowledge of details of setting up and running a simulator or may not have direct access to a simulator (e.g., or permission to directly use the simulator). As an example, a front-end can help to manage utilization of one or more simulators, for example, in a manner that may increase utilization efficiency to such one or more simulators and/or underlying computational resources. As an example, a system may be suitable for use by clients of an oilfield services provider, domain experts, etc., where the system can provide tools for visualizing fundamental insights into performance of wells, including potential interventions, to improve performance.

As explained, a system can include a front-end and a back-end where the back-end can provide one or more simulators (e.g., PIPESIM framework, etc.). In such an example, the front-end can help to ease access/use of a simulator such as a PIPESIM framework simulator.

As an example, a front-end can provide for managing workflows that involve real-world data input (e.g., flow, pressure, temperature, etc.) for a well and input as to acceptable production/other parameters. Such a front-end can include a "transform" component that uses real-world data and other input for generating scenarios as to simulation cases to run, for example, using the PIPESIM framework and/or one or more other frameworks. In such a system, simulation cases can be generated to be physically meaningful and representative of a problem and feasible solutions. As explained, one or more analyses may be performed such that cases may be honed, selected, etc., that have an increased chance of converging.

As an example, a back-end can provide for provisioning, executing, generation of results, etc., as may be instructed by a front-end. As an example, a system can perform a workflow that involves ranking simulation results that converge in terms of one or more criteria such as hydrocarbon production, which may account for water-cut or other factors. In such an example, ranking may be performed by a front-end and/or a back-end. As an example, each of a number of ranked simulation results can include actions for a workflow (plan) that can be applied to the well, which may be ordered in an effort to increase production. As an example, a workflow (plan) can be generic as to equipment and/or be more specific (or linked to equipment, process, etc., options for implementation).

As an example, a system may provide for execution of a workflow in an automated manner in that it could be scheduled to run every X days, etc., and/or be triggered by real-world data such as a change in conditions (e.g., flow, pressure, water-cut, etc.).

As an example, where multiple wells are processed, results may be utilized in a reservoir simulation (e.g., ECLIPSE, INTERSECT, etc.) to check the feasibility, for example, to see that one or more adjacent wells may be improved per a simulation or simulations without well-to-well interactions (e.g., an increase in production of one well impacts an ability to increase production in an adjacent well).

A system can be utilized in a manner that enables a user to select an optimal intervention opportunity for a given well, for example, from a number of different intervention opportunities. In such an example, the system can include a user interface that provides for access to advanced flow assurance science and domain knowledge in an efficient manner. For example, such a UI enables a user to quickly and efficiently set up, run, compare, and analyze a large number of simulations using one or more simulators such as, for example, the PIPESIM steady-state multiphase flow simulator. In such an approach, a user with scant detailed knowledge of the simulation framework or frameworks may successfully run simulations to generate results (e.g., where direct interaction may be a very tedious task for the user).

As an example, a system can provide for assessments as to various field operations, equipment, etc. For example, consider a system that can handle wells, well jobs, technical proposal, control actions, etc.

As an example, a system may receive a well intervention candidate with interpreted production log data. Such a candidate can be associated with one or more well jobs where a given well can have several well jobs, some in the past and some in the present. For example, consider well job states such as: new, active, submitted and executed.

As an example, a system can generate one or more deliverables. For example, consider a well intervention technical proposal, which may be digital, time stamped and protected from accidental changes. Such a proposal can be a basis for further and more detailed planning and execution. For example, such a proposal can include one or more instructions that can be transmitted to one or more pieces of equipment for taking action(s) in the field for a well, wells, surface equipment, etc.

As an example, a system can include features for capturing feedback, which can include, for example, capturing client feedback, sensor data feedback, simulator usage feedback (e.g., convergence, time to execute, number of iterations, resources utilized, etc.), which may be saved with a well job. Such feedback may be stored in one or more data storage devices, which can contribute to a historical database that may be used for analytics, projecting chance of success in future well jobs, optimizing provisioning of resources, optimizing execution of simulation cases, etc.

As to a team approach, consider a team involving Alex, Fred and Daniela, where Alex can be a primary member that works alone or with Fred to prepare a best well intervention technical proposal for a given well. In such an example, Fred may be present with Alex, for example, providing him with well details and discussing the presumably best well interventions for the well at hand. In a longer term Fred may also become a primary user, working with Alex or alone. As to Daniela, she can be a receiver of output such as a well intervention technical proposal for a given well. Daniela may use a system to get an overview of current and previous well jobs, print out proposal details and, for example, enter client feedback from executed well interventions (well jobs). As an example, Daniela may be an operator or work with an operator to implement one or more actions, for example, via one or more controllers, etc.

Figure 9:
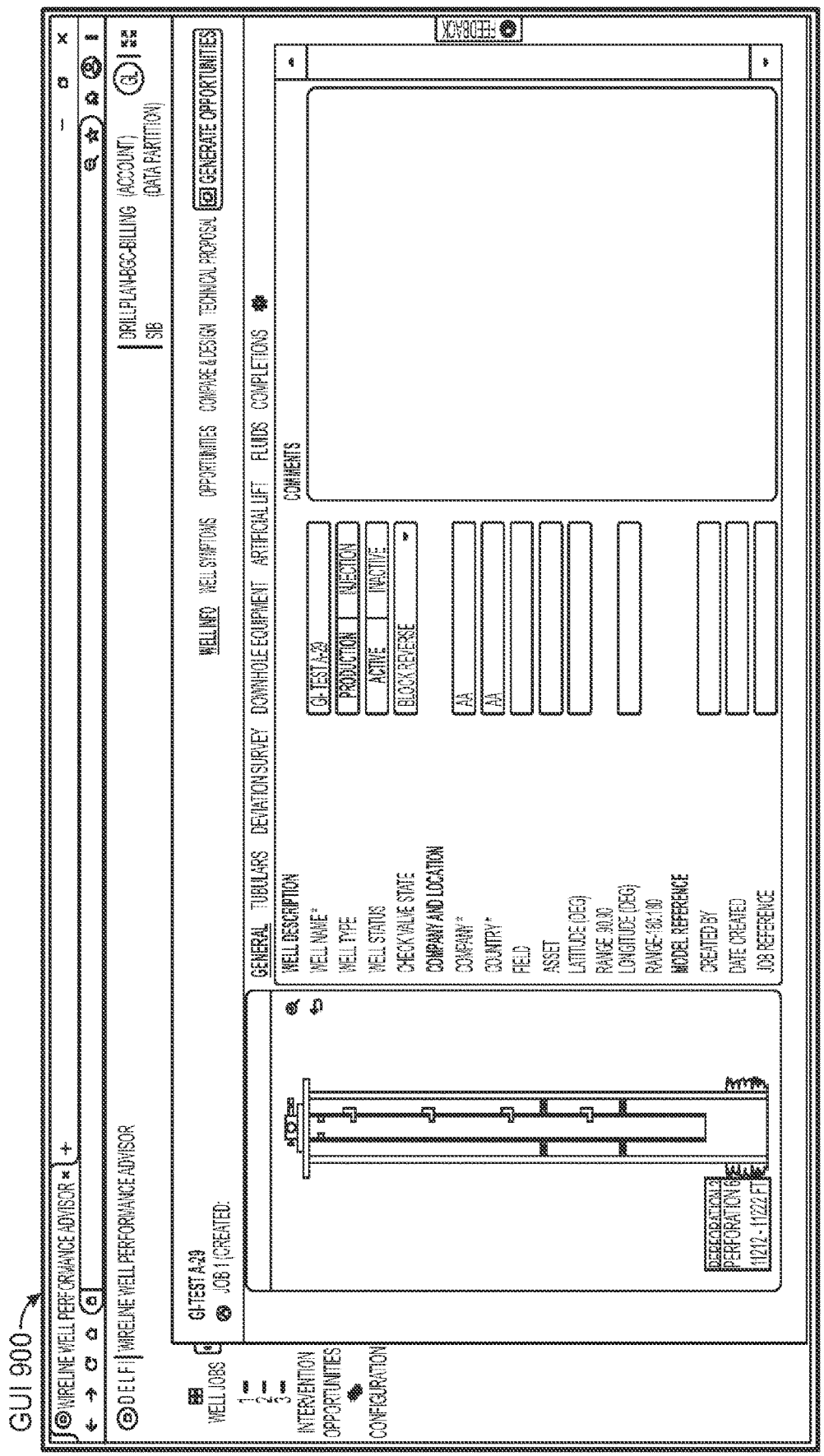

FIG. 9 shows an example GUI 900 for a well model description. Such a GUI can be in the form of a web type application where pages allow for the definition and QC of a complete well model definition, for example, internally represented by a JavaScript object notation (JSON) structure.

As shown in FIG. 9, the "well info" graphic is selected where a well description is provided along with a graphic of a well. High-level info about the well, A well sketch is shown on the left, defined by details on the following pages.

Figure 10:
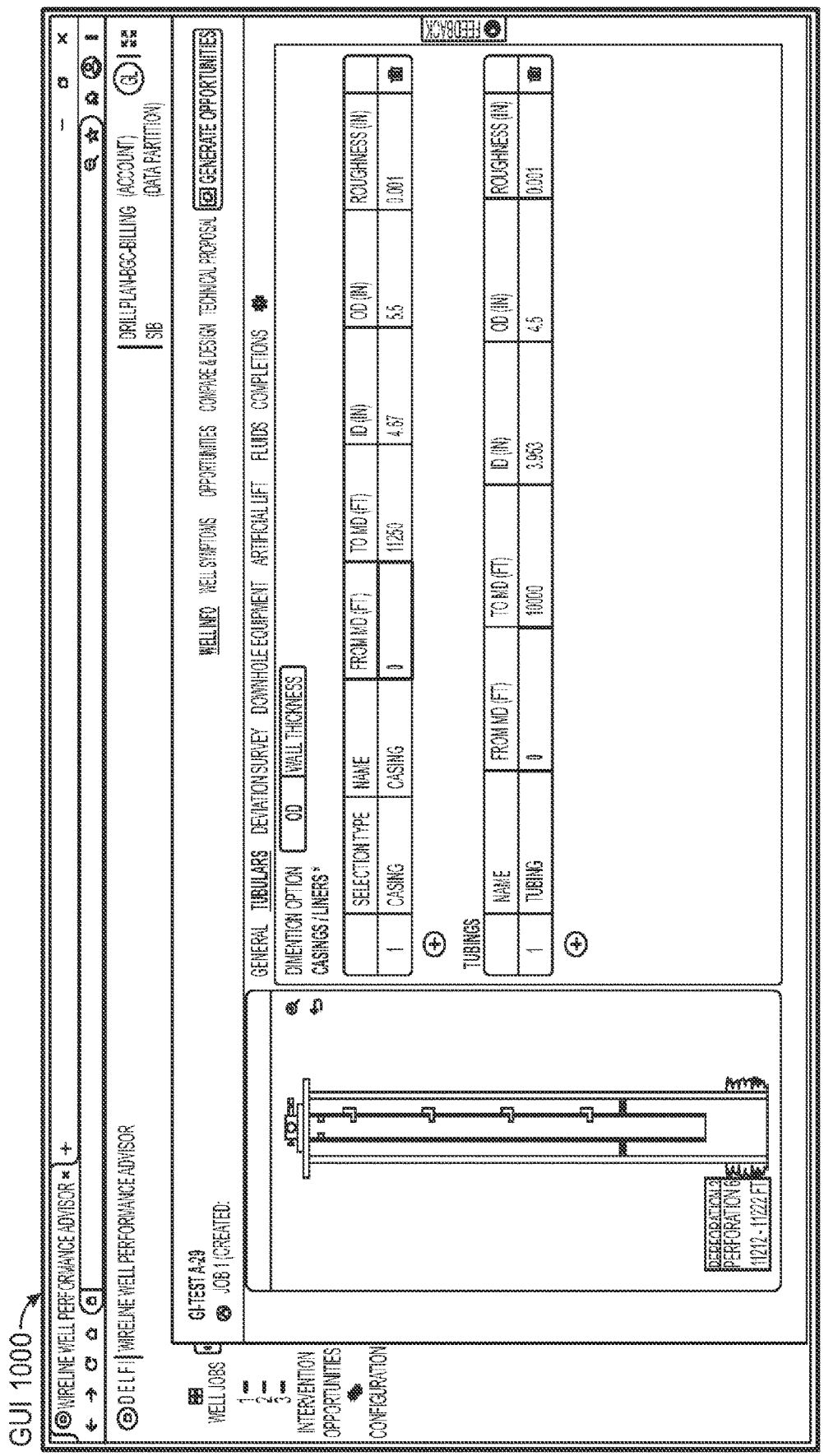

FIG. 10 shows an example GUI 1000 for tubulars, which can include fields for describing an outer diameter, a wall thickness, etc., for casing, liners, tubings, etc. In such an example, various pipe elements can be described that can include one or more casings.

Figure 11:
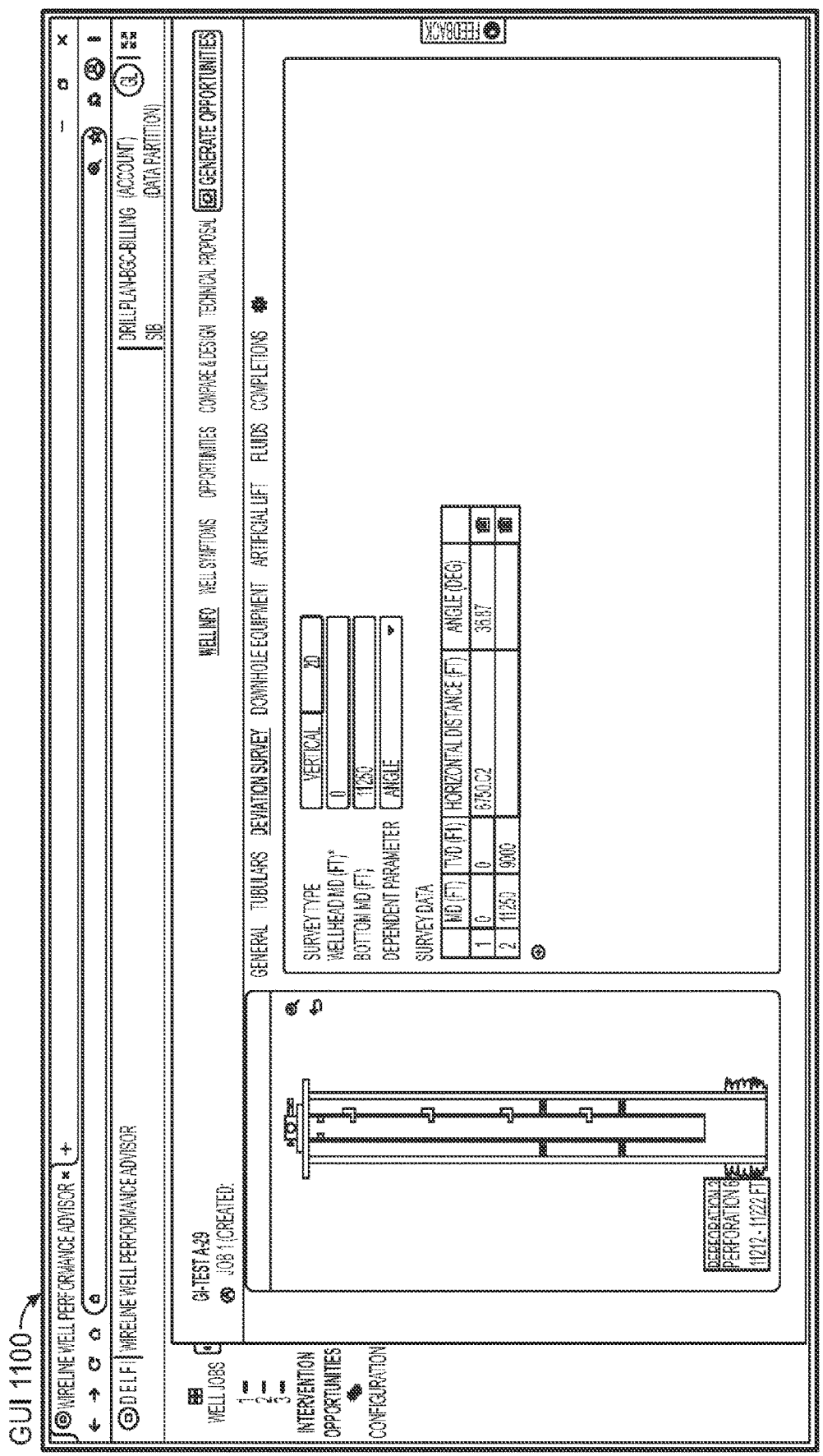

FIG. 11 shows an example of a GUI 1100 for a deviation survey, which can describe the geometric curvature of the well. For example, a survey type may be selected, bottom depth as measured depth, various survey data (e.g., as may be acquired during drilling, etc.), which can include measured depth and total vertical depth (TVD), along with horizontal distance and angle.

Figure 12:
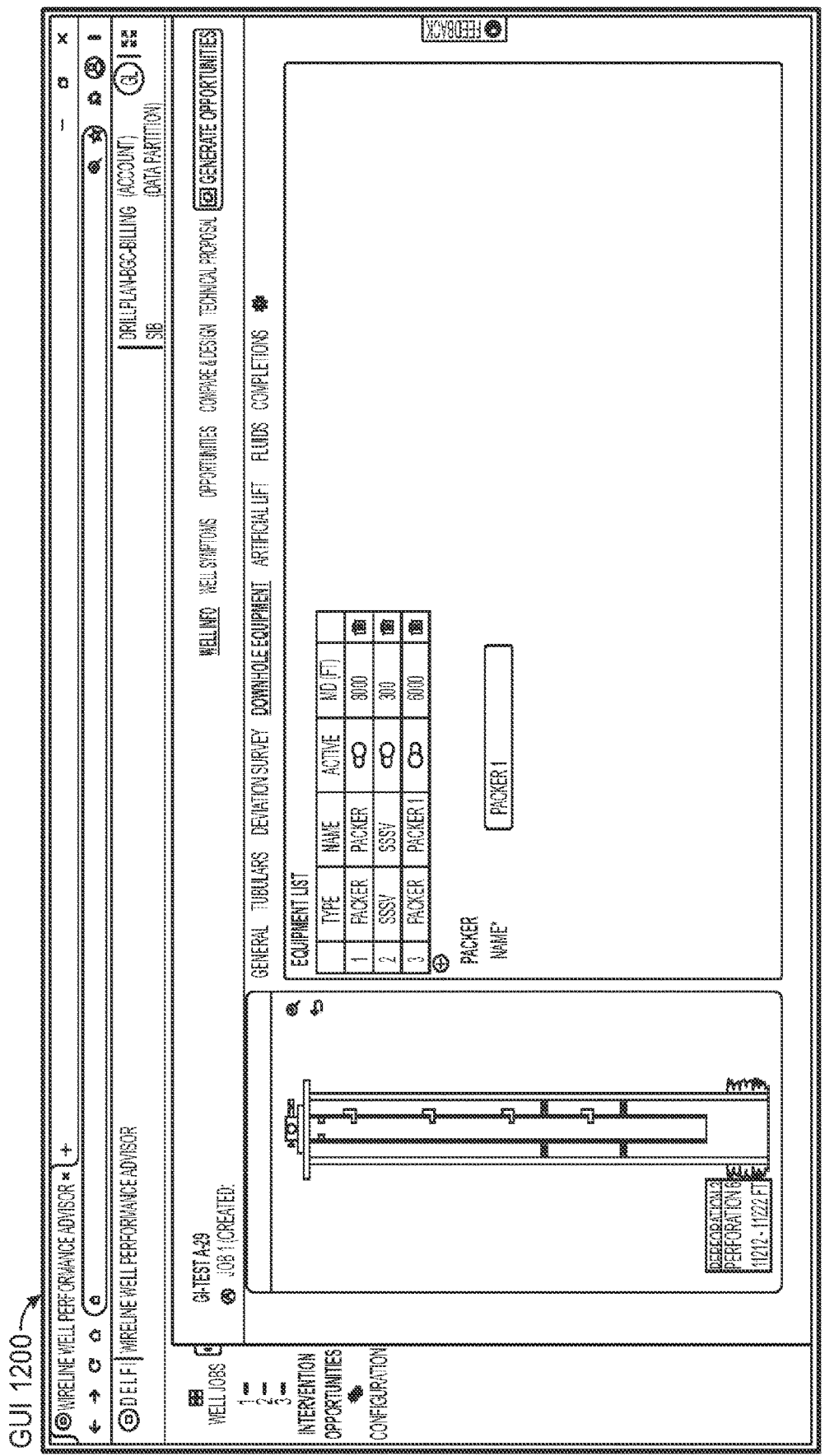

FIG. 12 shows an example of a GUI 1200 for downhole equipment, which can provide for descriptions of various types of borehole equipment, and whether one or more pieces are currently active in the well or not. In such an example, inactive equipment may be shown in a well graphic as faded out light grey whereas active equipment may be shown differently (e.g., in color and/or not faded out). As shown, a graphic for an equipment list can include type, name, active/not active and position given per measured depth.

Figure 13:
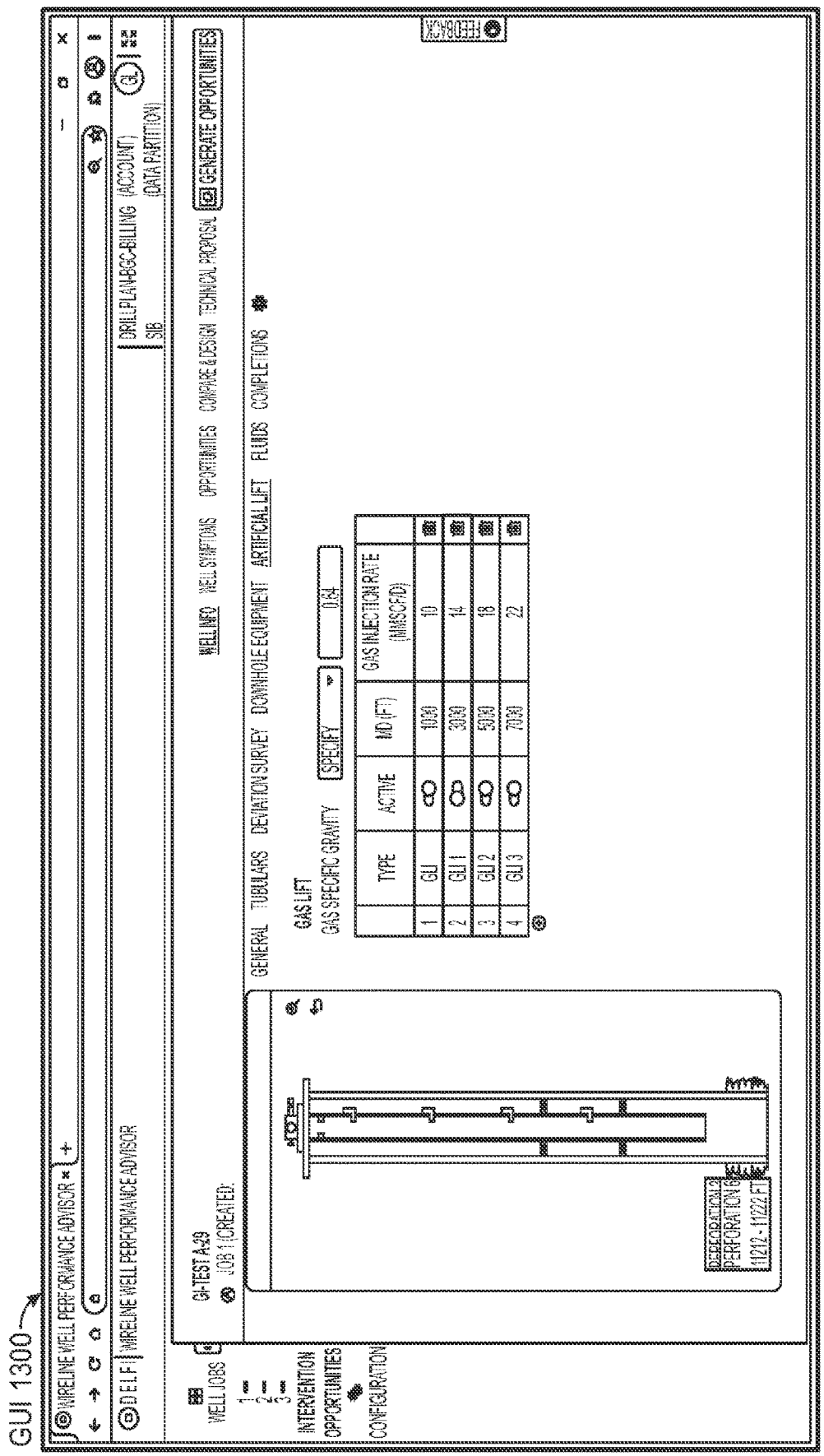

FIG. 13 shows an example of a GUI 1300 for artificial lift equipment, which may include one or more types of equipment (e.g., gas lift, electric submersible pump (ESP) lift, etc.). As shown, a graphic can be utilized to specify particular equipment and/or gas properties. For example, consider gas injection rate and gas specific gravity for gas lift.

Figure 14:
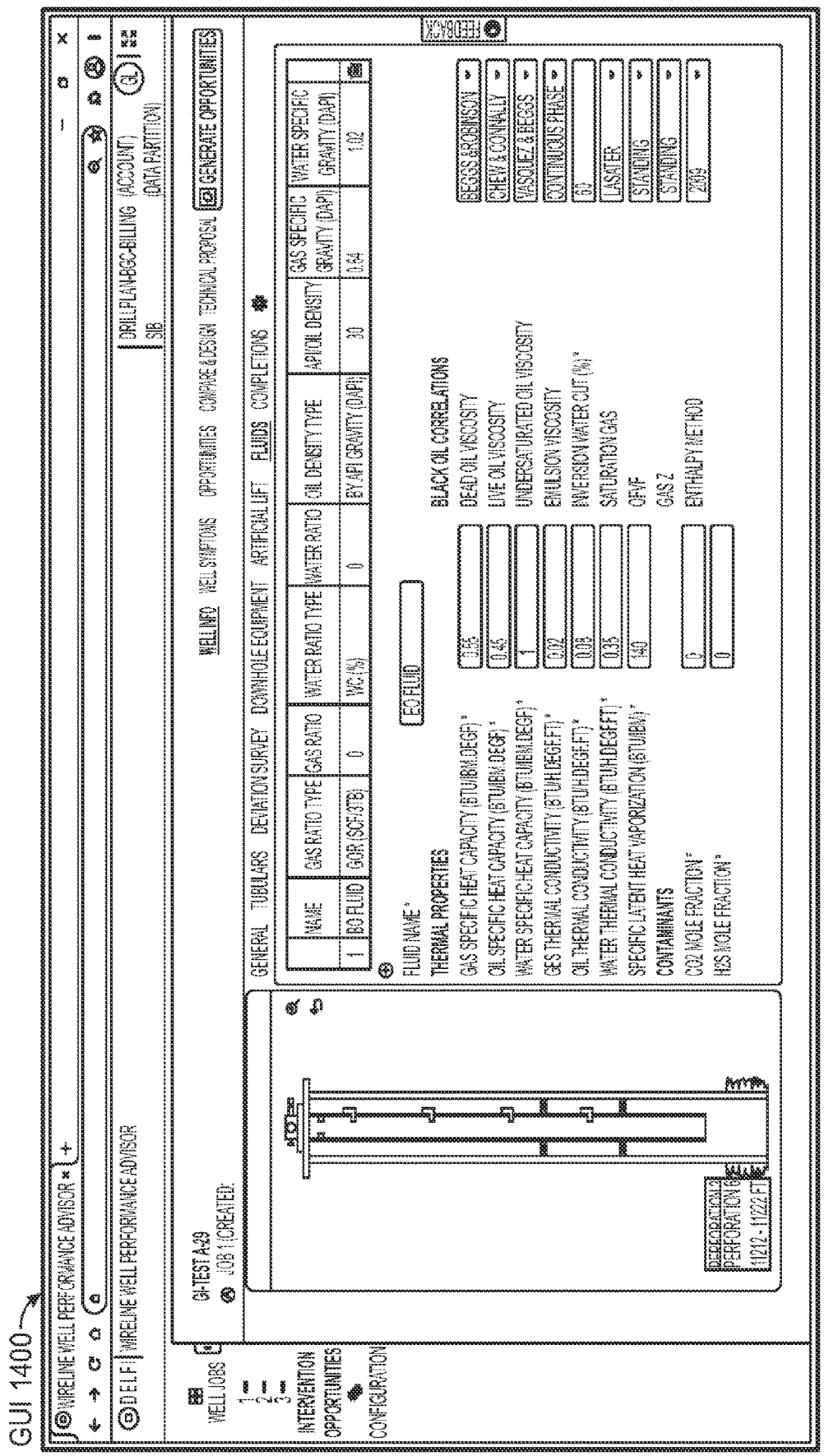

FIG. 14 shows an example of a GUI 1400 for fluids. As shown, fluids may be named and specified using gas ratio type, gas ratio, water ratio type (e.g., water cut, etc.), oil density type, gas specific gravity, etc. As shown, thermal properties may be entered and/or otherwise populated (e.g., using sensor data, etc.). As shown, black oil correlations can be given for a fluid. In various instances, fluid properties, types, etc., may be utilized by one or more simulators.

Figure 15:
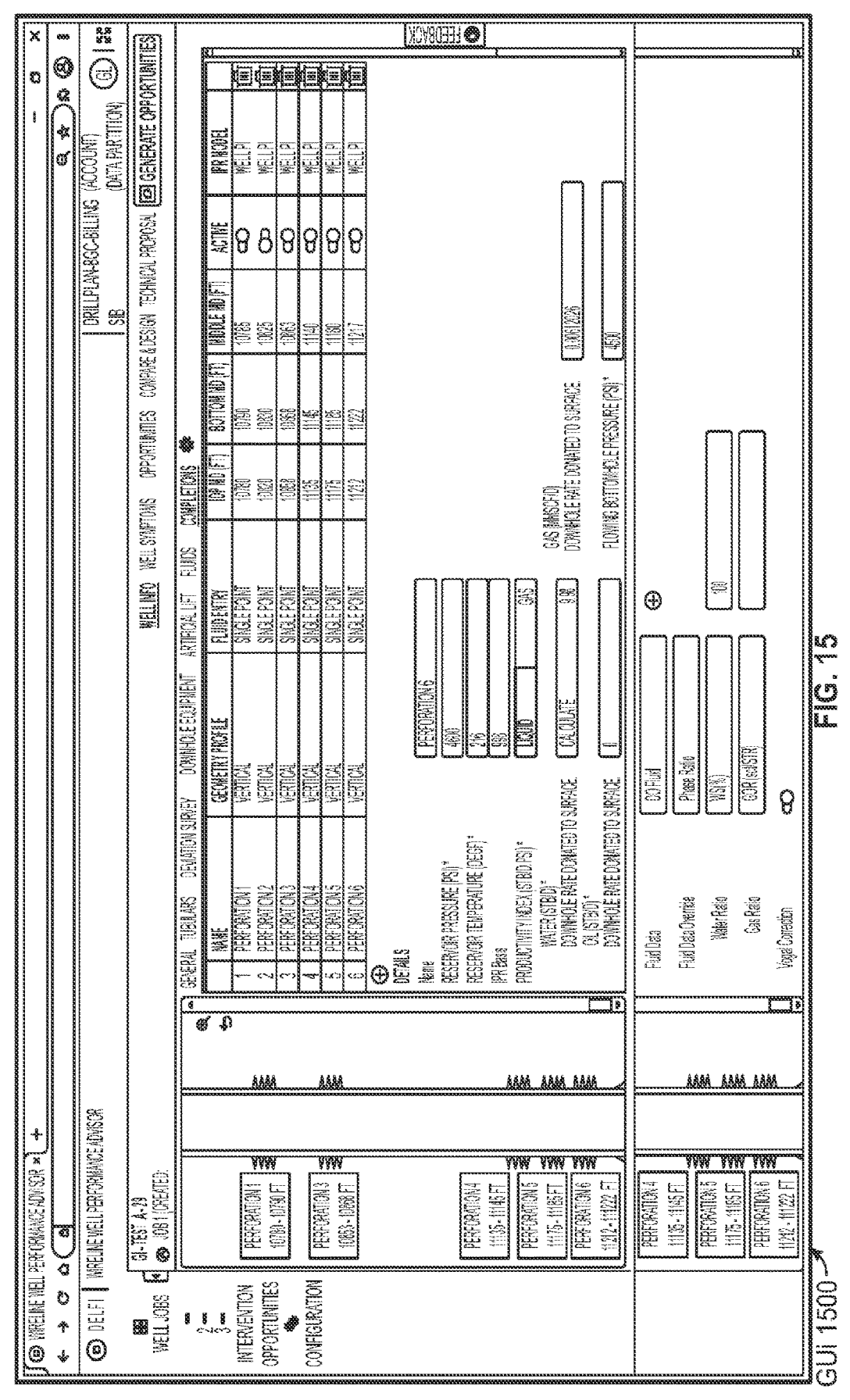

FIG. 15 shows an example of a GUI 1500 for completions, which can include graphics in table form for various types of completion equipment. As shown, various perforations can be listed with geometry, fluid entry, top MD, bottom MD, middle MD, active, inactive, etc. As an example, a perforation may be selected such that details can be shown, for example, as to reservoir pressure, reservoir temperature, IPR basis, productivity index, water rate, oil rate, gas rate, flowing bottom hole pressure, etc. As shown, fluid data, fluid data override, water ratio, gas ratio, Vogel correction, etc., may be included. The GUI 1500 can describe various perforations in a well and, for example, whether they are active or not. As explained a well graphic can indicate perforations and whether they are active or not for a particular case. For example, the GUI 1500 may be for setting up a base case (e.g., a base scenario) that can be simulated where simulation results can be used for comparison, for example, where flow from perforations can be color coded or otherwise coded to indicate one or more of water, oil and gas. In the example of FIG. 15, the gas-oil-ratio (GOR) is empty as Oil=0 and cannot be divided by, hence value is undefined.

Figure 16:
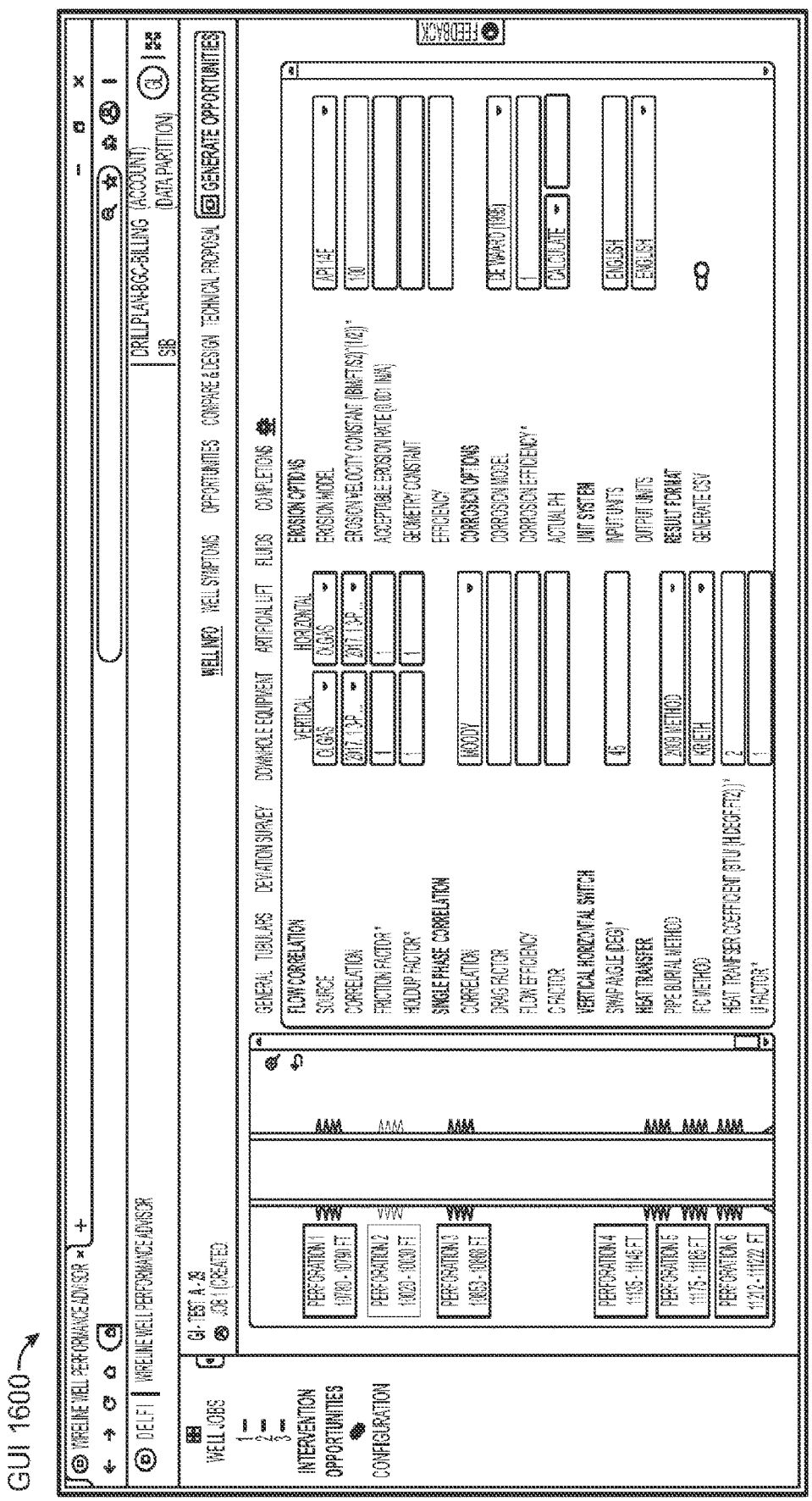

FIG. 16 shows an example GUI 1600 for configurations, which can include information for flow correlation, single phase correlation, vertical horizontal switch, heat transfer, erosion options, corrosion options, unit system, result format, etc. For example, consider one or more digital formats for results. The GUI 1600 can include or provide access to fields for advanced configurations for fine tuning of a well description.

Figure 17:
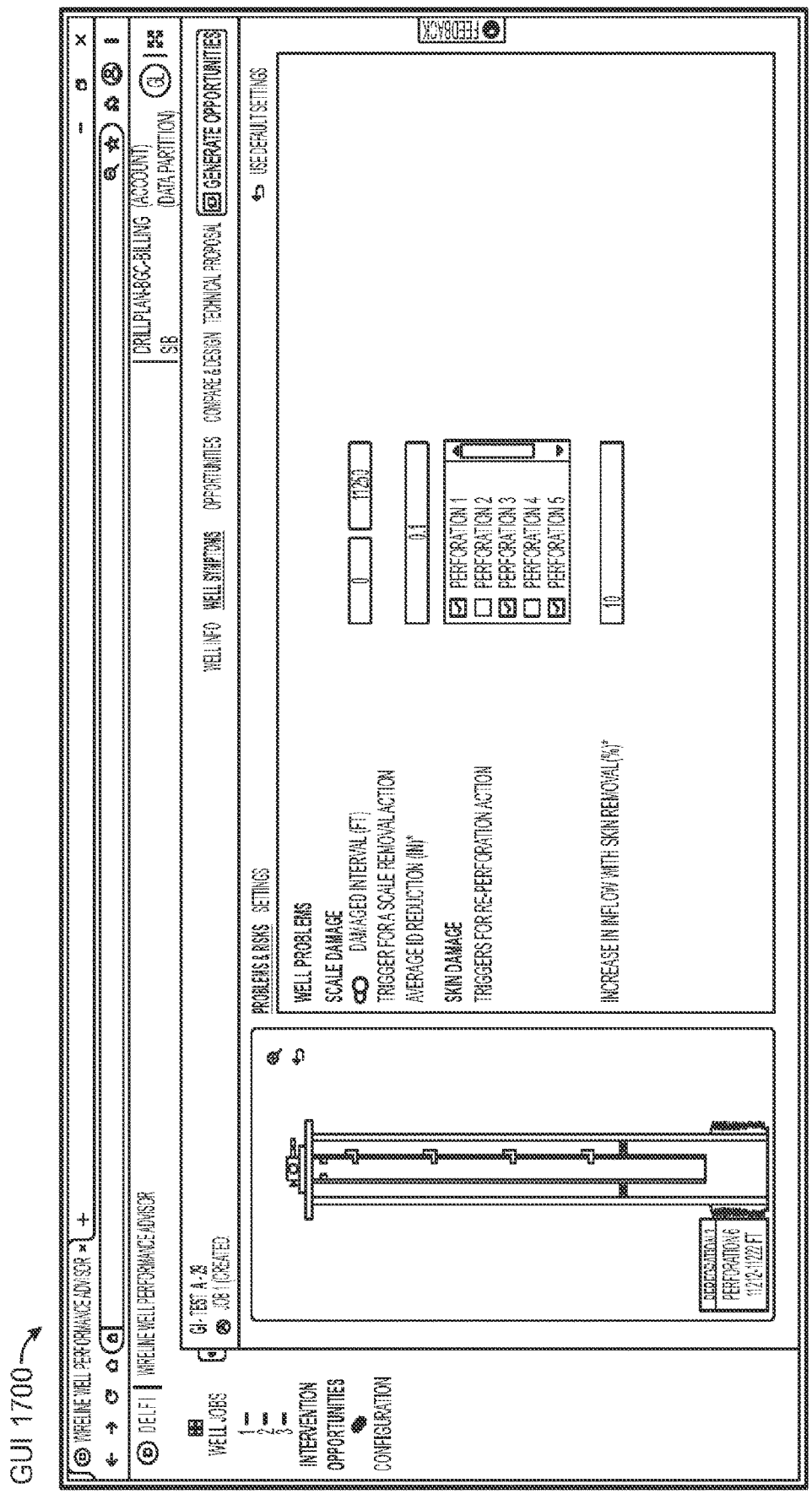
Figure 18:
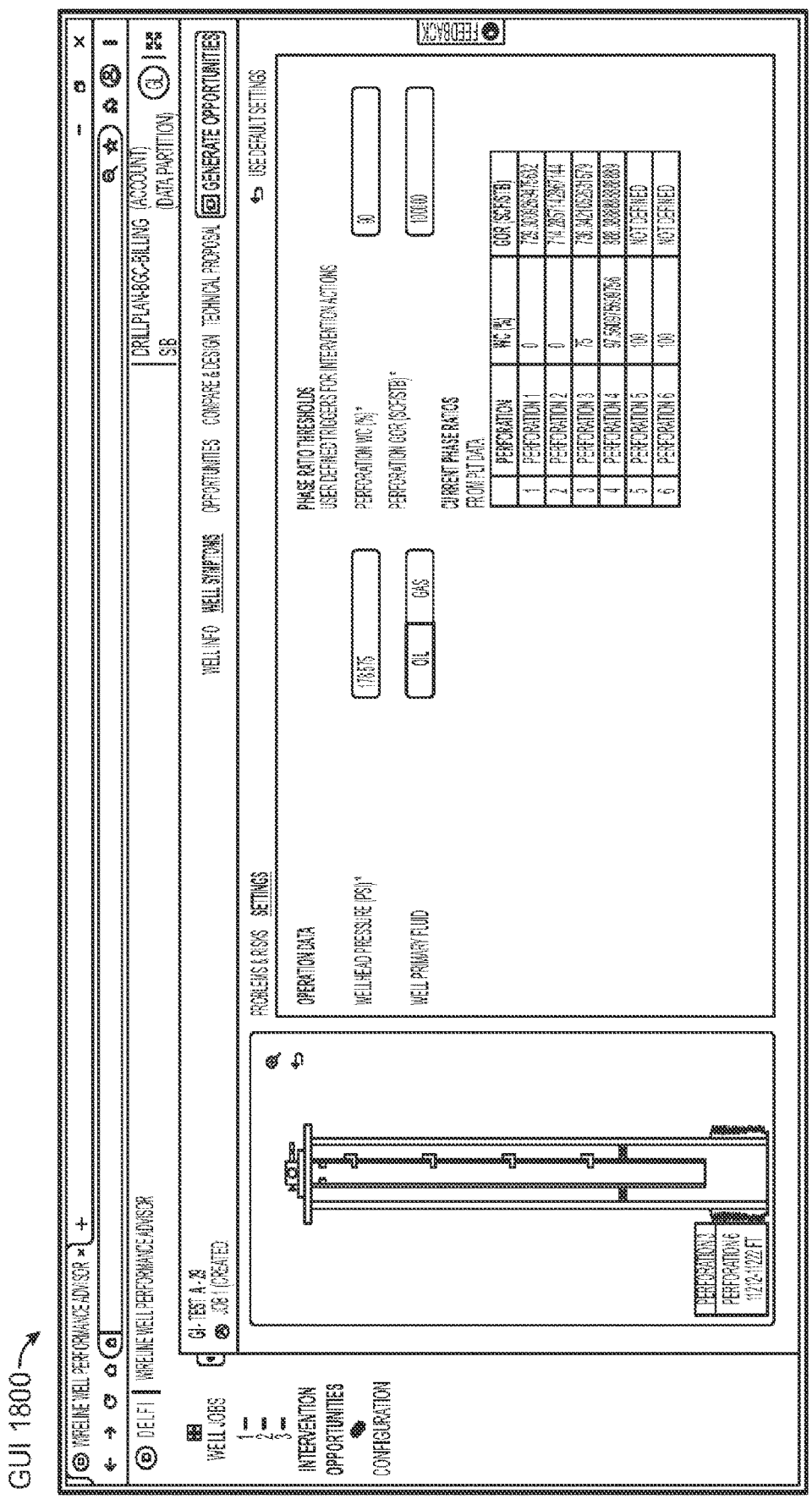

FIG. 17 and FIG. 18 show example GUIs 1700 and 1800 for various information as to one or more well symptoms. For example, consider information as to well problems such as scale damage, skin damage, etc. As shown, various perforations may be indicated. In the GUI 1800, operational data may be provided such as, for example, wellhead pressure, well primary fluid, phase ratio thresholds, etc. Information as to well symptoms may be processed to determine various well intervention actions, which may be utilized to generate one or more scenarios.

Figure 19:
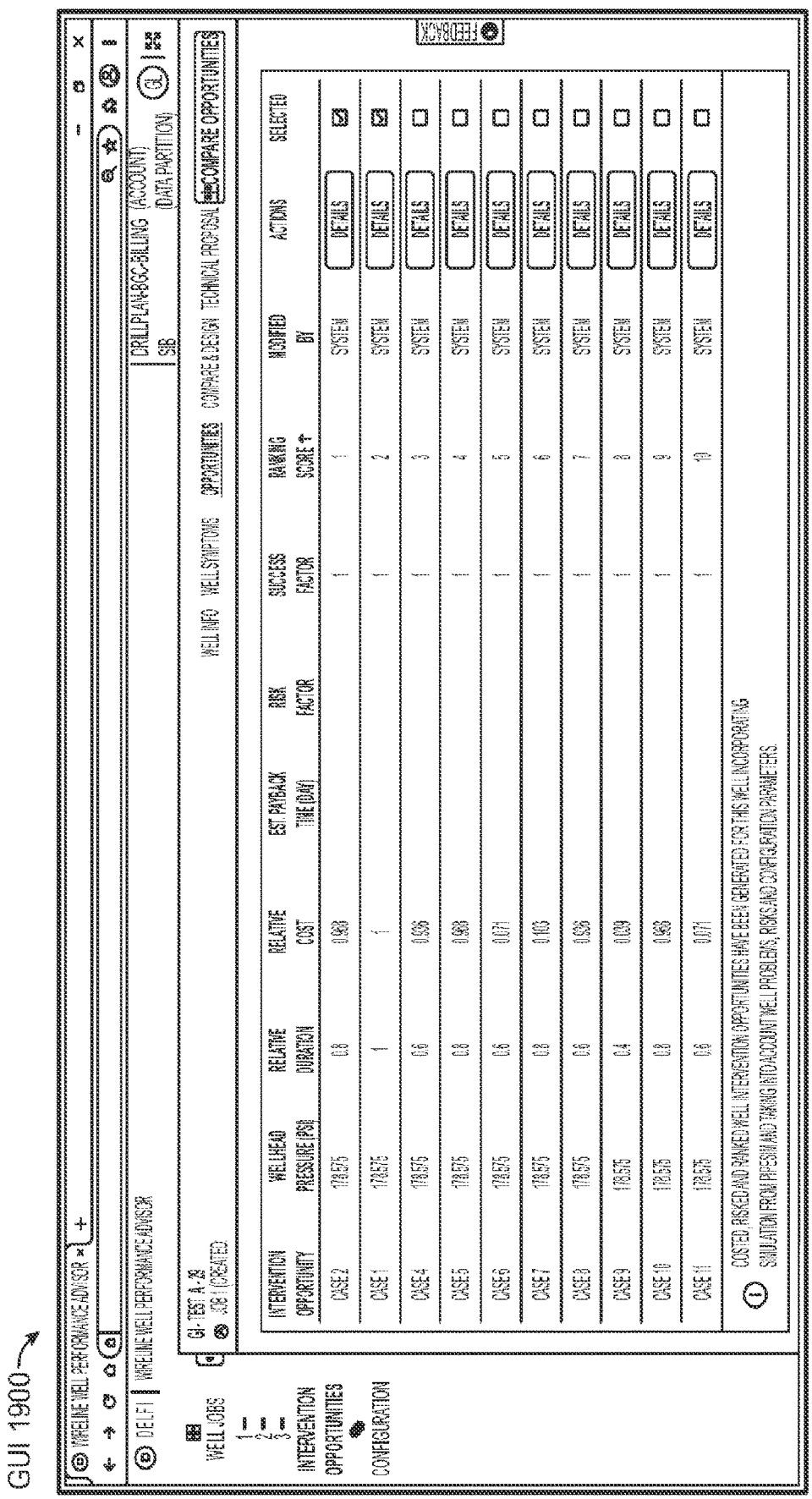

FIG. 19 shows an example GUI 1900 for various well intervention opportunity cases. Such a GUI may show potential cases in a matrix. As an example, when the well model and well symptoms description is complete, a user may proceed to click a "Generate Opportunities" graphic control (e.g., a graphic button) that can initiate a process where the available info is analyzed and a number of different combinations of intervention actions are generated, for example, for display in a matrix. In the example GUI 1900, each row in the matrix is referred to as a well intervention opportunity case where there can be a number of cases, from a few to tens or hundreds of cases or more.

As explained, a system may provide for trimming a matrix and simulating cases. As an example, opportunity cases that are physically impossible or not logical according to flow assurance domain rules (e.g., or other rules, parameters, etc.) may be removed such that remaining cases as well as a base case (pre-intervention case) can then be converted to a format suitable for consumption by a simulator framework (e.g., PIPESIM, etc.) and transmitted for simulation, for example, via one or more flow assurance simulation services that may be cloud-based. For example, consider a matrix with cases that are to be run using the PIPESIM steady-state multiphase flow simulator, which may be instantiated multiple times or a single time for purposes of executing the cases. As an example, multiple simulations may be run in parallel, depending on the amount of cloud resources allocated (e.g., provisioned).

As an example, a system may provide for generating cases in a time period that may be of the order of minutes (e.g., several minutes), which may depend on resources utilized. As an example, a graphic may be rendered that provides progress updates, and at the end, a toast message (e.g., a small popup dialog at the top-center) to inform a user about success or failure as well as elapsed time.

As explained, a system can provide for capturing, ranking and presenting the top simulation results. As mentioned, some simulations might not converge, and thus can be ignored. Converging simulations can then be ranked by a ranking component from high to low performance (e.g., using hydrocarbon gain, etc.). In such an example, a top number of cases may be presented to the user. For example, the GUI 1900 can include a presentation of ranked cases.

Figure 20:
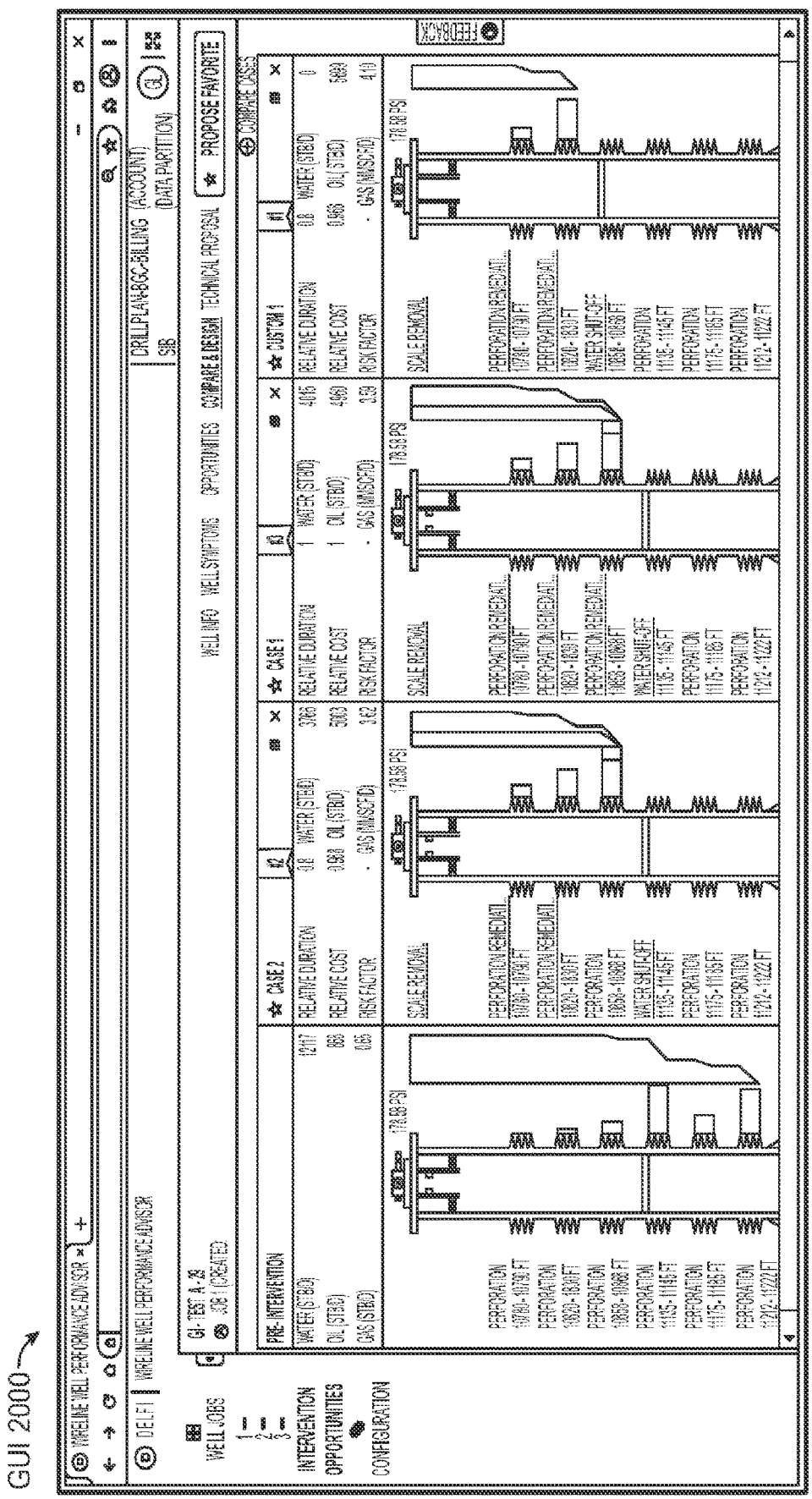

FIG. 20 shows an example GUI 2000 that includes visualizations as to the pre-intervention case, Case 2, Case 1 and Custom 1. The GUI 2000 shows a real well example where the well intervention is known. The system appropriately suggested setting a plug as a water shut-off action between perforation 3 and 4.

As shown in FIG. 20, a custom case, an additional simulation was run to see the effect of setting the plug between perforation 2 and 3, and thus reducing water production entirely. As indicated via numerical values, Custom 1 case indicates that oil production would be even higher.

Figure 21:
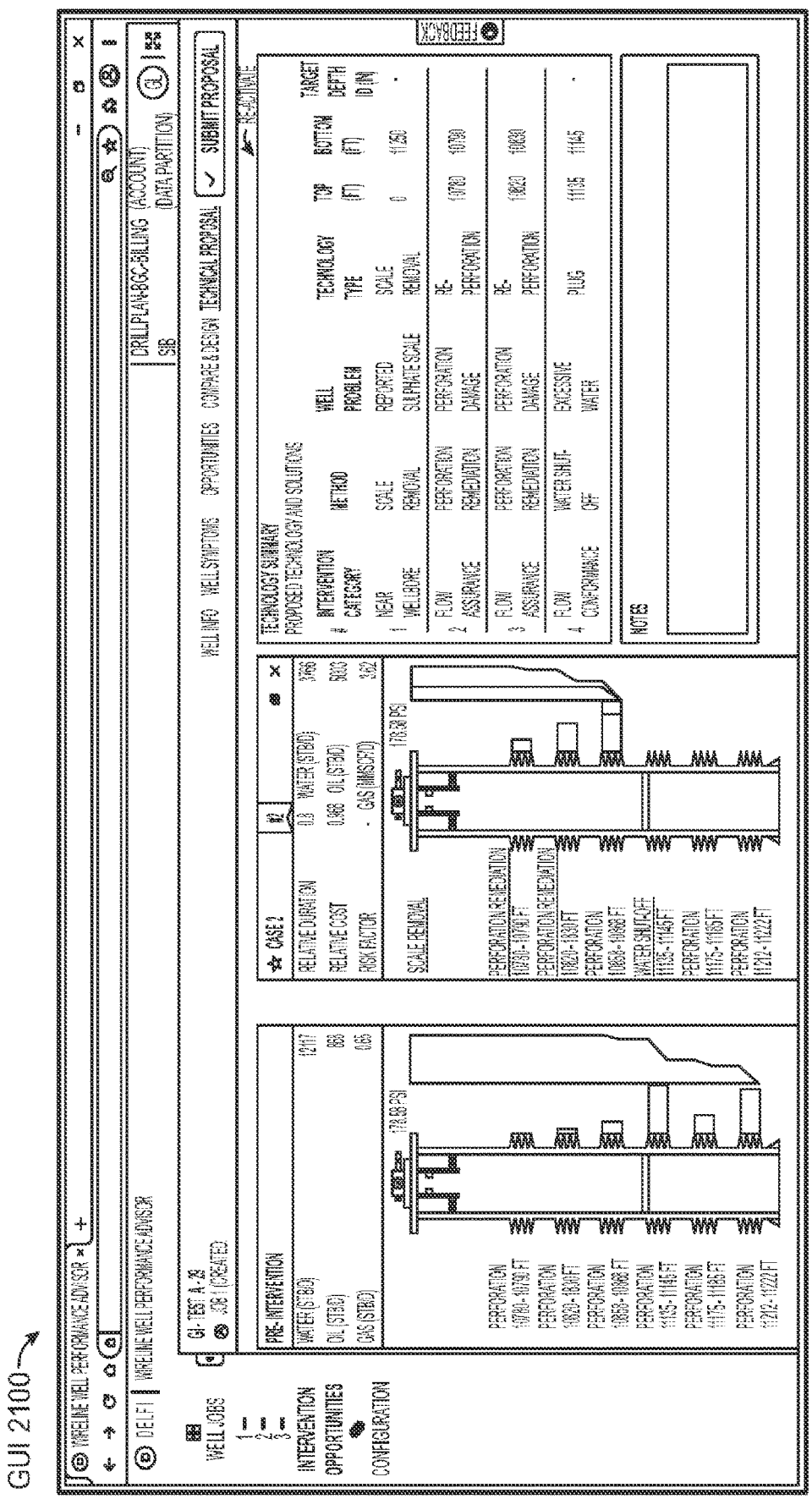
Figure 22:
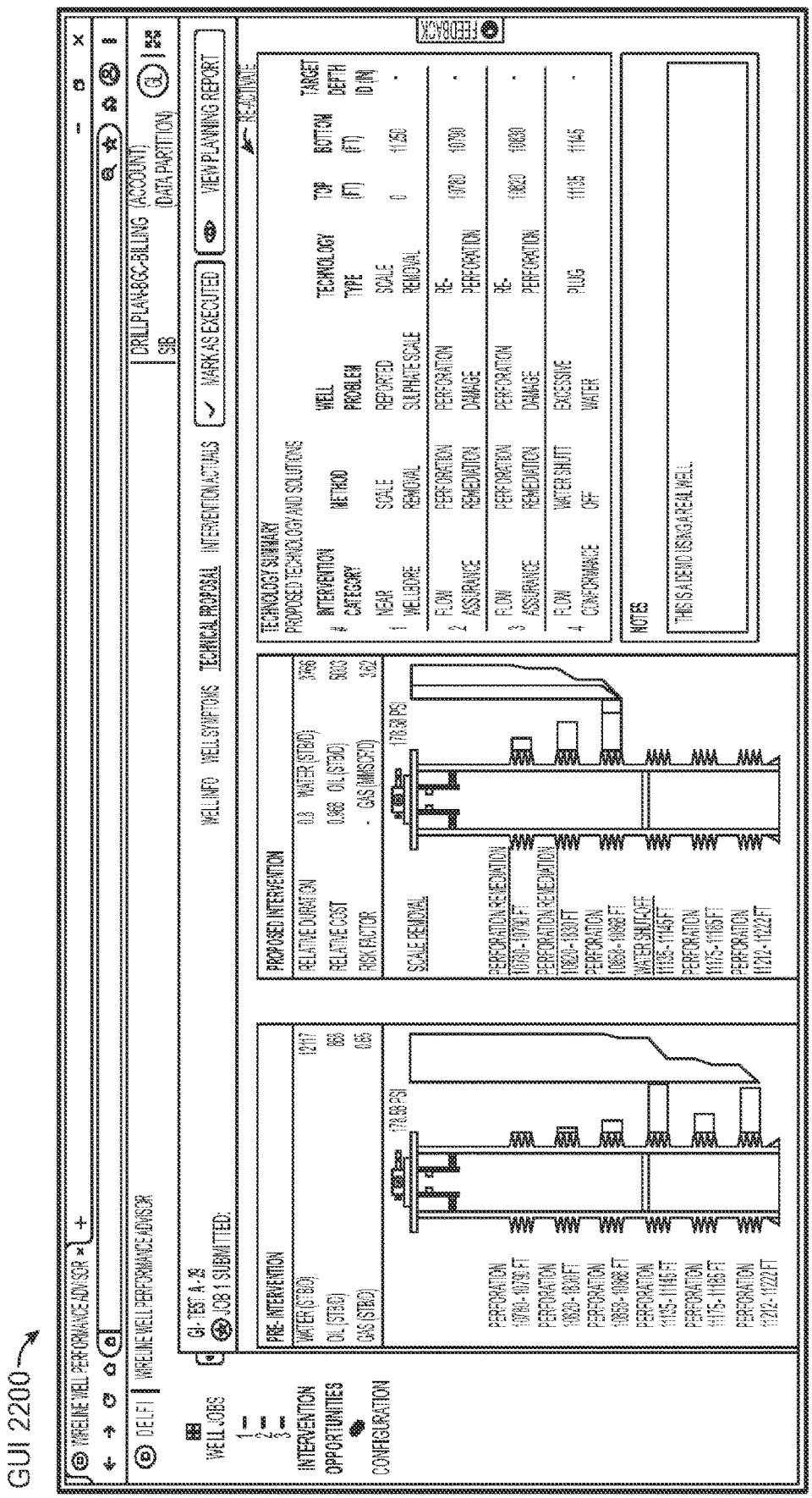

FIG. 21 and FIG. 22 show example GUIs 2100 and 2200 for proposing and/or submitting a particular case as a technical proposal of a well job. As an example, well information (e.g., model) and well symptoms for a submitted well job may be frozen, meaning they can be viewed but not changed. Such an approach can help to represent the description matching the pre-intervention and proposed intervention.

As an example, a submitted well job may be re-activated to allow proposing another case or even changing/updating the well model or symptoms and re-generating the simulations.

Figure 23:
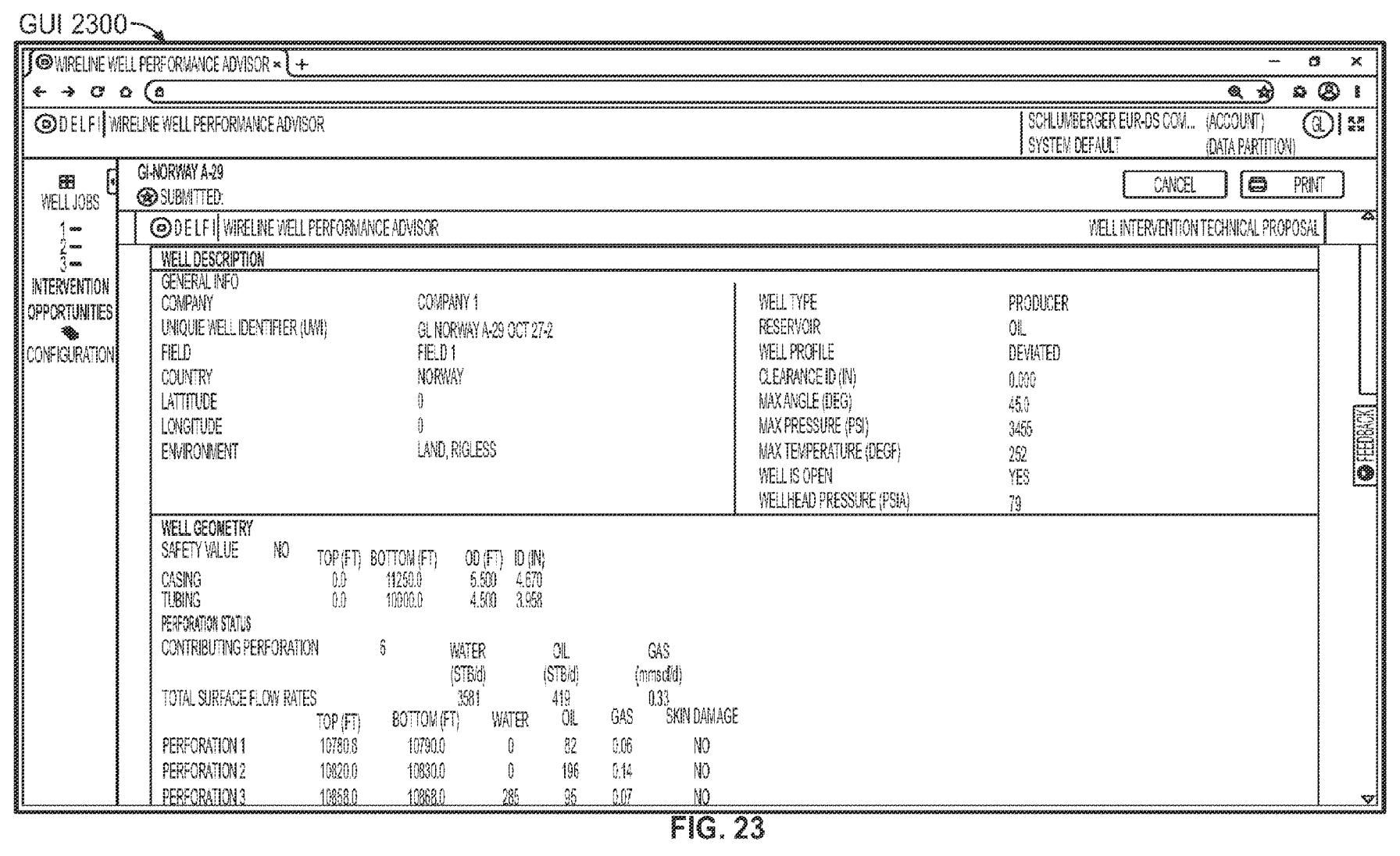

FIG. 23 shows an example GUI 2300 for viewing, printing and sharing a planning report. In such an example, clicking "View Planning Report" can allow for a preview of the report before transmission (e.g., as a digital file, etc.).

Figure 24:
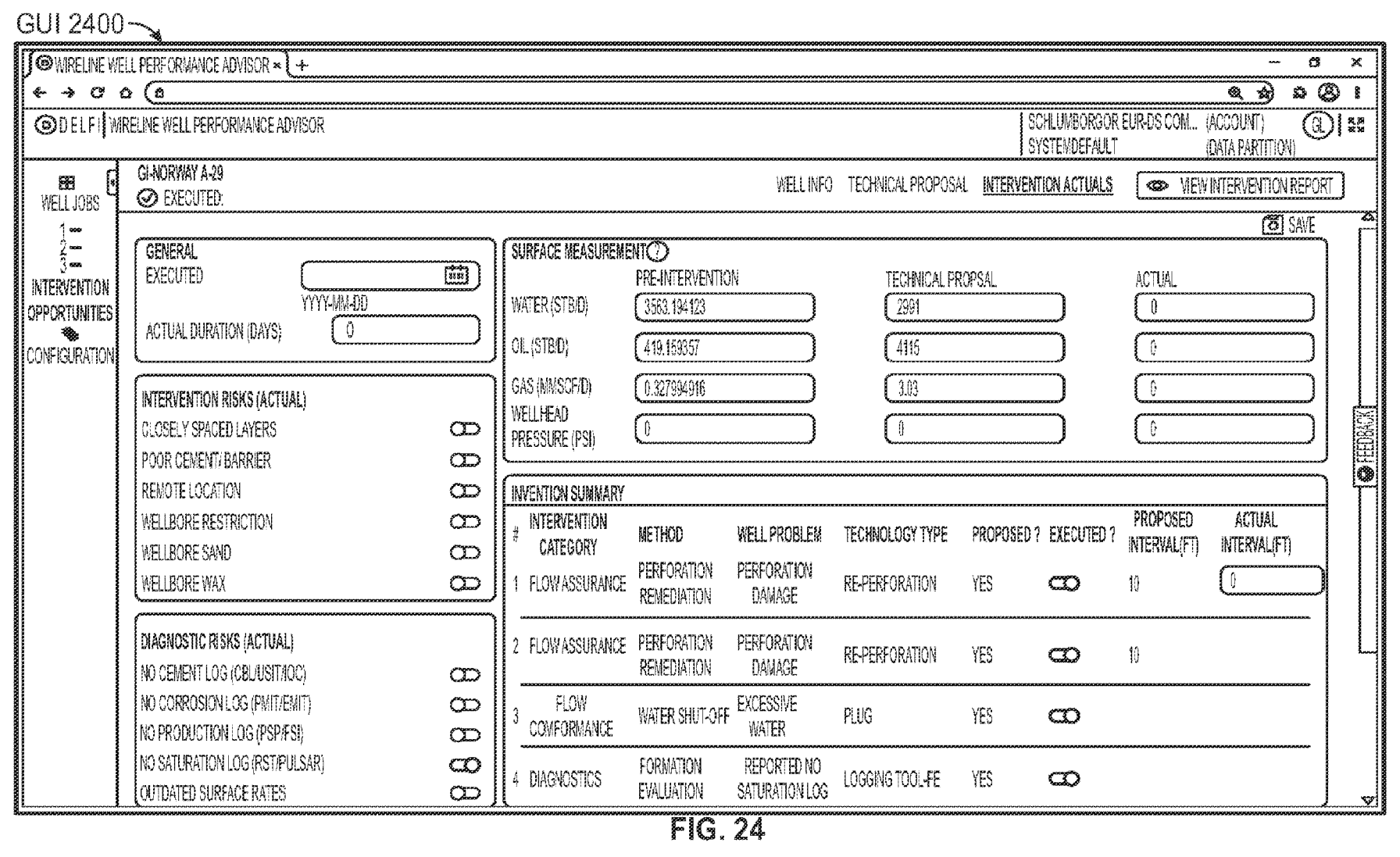

FIG. 24 shows an example GUI 2400 for marking a technical proposal as executed, which may also provide for capturing sensor data, actual operations data, feedback, etc.

Figure 25:
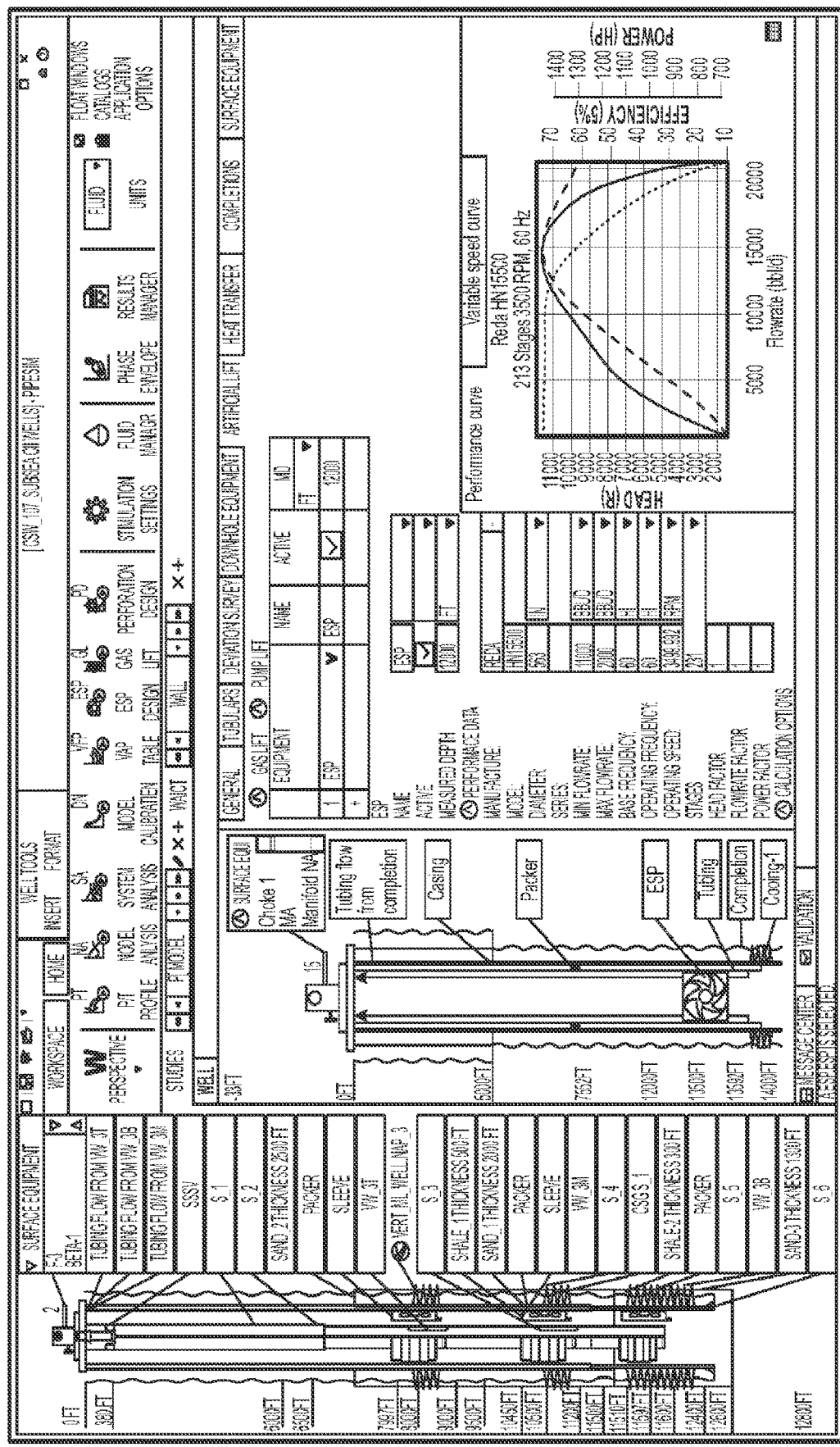
FIG. 25 illustrates an example of a simulation framework graphical user interface.

FIG. 25 shows an example of a GUI 2500 of a simulation framework. The GUI 2500 shows various features of the PIPESIM 2017 steady-state multiphase flow simulator. The level of skill, training, etc., to operate the PIPESIM framework simulator via a GUI such as the GUI 2500 can be quite high and may be confounding for an individual without training. A system such as the system 500, the system 600, etc., can provide for targeted problem solving automatically and/or semi-automatically where an individual may interact with more streamlined system GUIs that can generate scenarios that aim to address one or more problems. Such a system can also provide for analyses, assessments, selections, implementations, executions, etc., that may address one or more issues.

Figure 26:
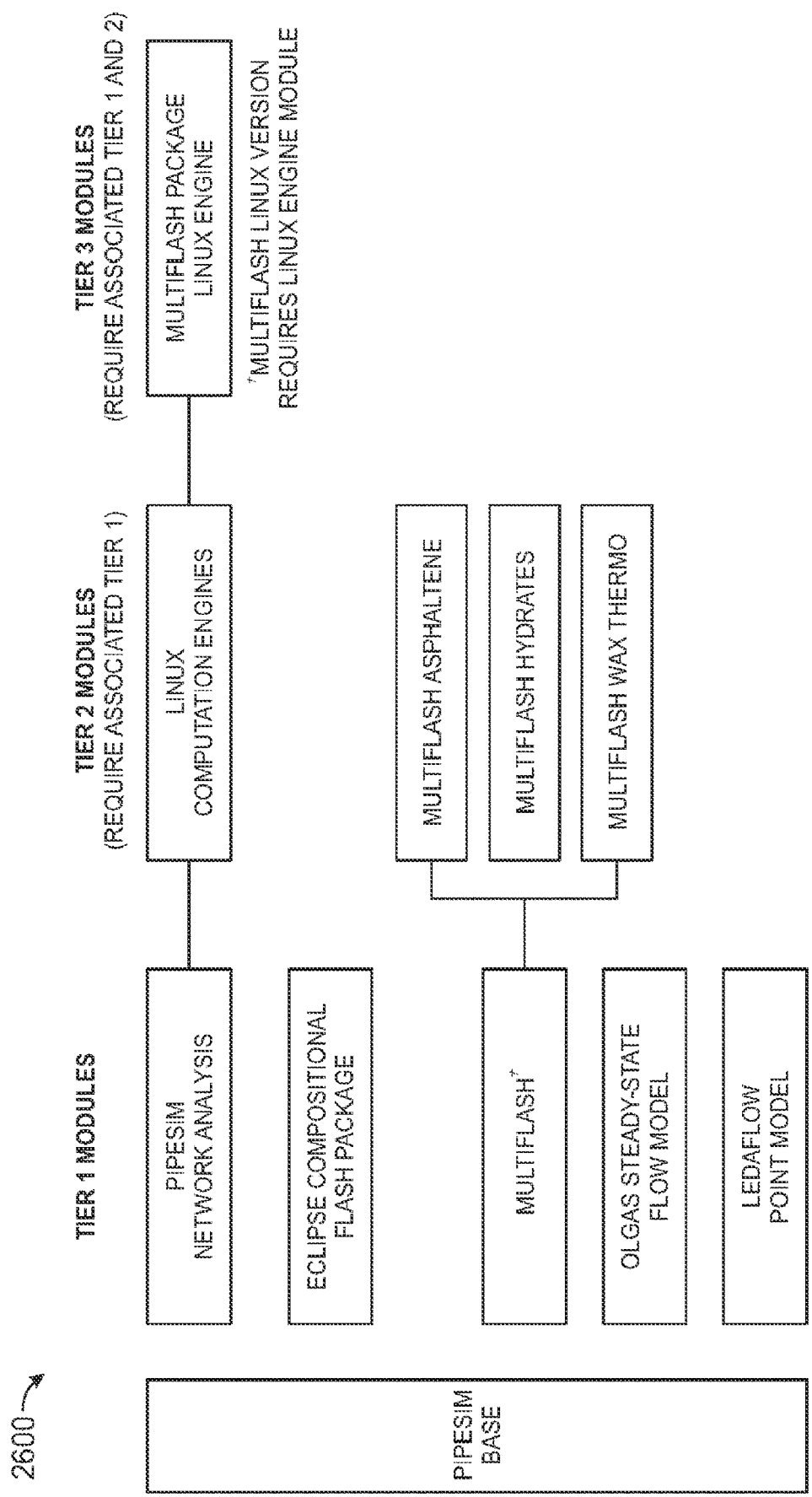
FIG. 26 illustrates examples of features of an example of a simulation framework.

FIG. 26 shows examples of features of an example of a simulation framework 2600, which can include relatively sophisticated and complex features that may demand an extensive level of training. As explained one or more frameworks may be utilized, optionally via a framework environment (see, e.g., FIG. 1). As shown in FIG. 26, the ECLIPSE framework may be utilized, an OLGA model may be utilized, various flash frameworks may be utilized (e.g., as to fluid states, transitions, etc.). In various instances, where a particular scenario may demand further assessment, a system may provide a data set and/or instructions that are for a generated scenario that can expedite further assessment using a GUI such as the GUI 2500 of FIG. 25 and/or one or more of the features of FIG. 26. However, in various instances, results from a generated scenario will suffice for improving production where a system such as the system 500, the system 600, etc., can provide such results in a relatively straightforward and expeditious manner without demanding involvement of an individual or individuals with training in handling of stand-alone simulator runs.

As an example, a method can include receiving inputs for a well; generating scenarios for the well using the inputs; instructing a simulator to simulate generated scenarios; receiving simulation results for at least some of the generated scenarios; and assessing the received simulation results for implementation of one or more well actions for the well. In such an example, assessing the received simulation results can include ranking the received simulation results based on at least one well performance criterion.

As an example, one or more well actions may address a well issue for a well. For example, a scenario may pertain to one or more actions for a well issue.

As an example, a method can include generating scenarios in a manner that involves constraining the scenarios based at least in part on one or more iterative simulation convergence criteria.

As an example, a method can include performing at least one of one or more well actions for a well, where the at least one of the one or more well actions corresponds to one of a number of generated scenarios. In such an example, the method can include comparing performance of the well after the performing to performance of the well per simulation results for the one of the generated scenarios.

As an example, a method can include assessing via rendering one or more graphical user interfaces to a display. In such an example, the assessing may include receiving input such as to compare one or more scenarios.

As an example, a generated scenario can correspond to a current operational state of a well where a method that includes assessing includes comparing simulation results for the current operational state generated scenario to simulation results for at least one of the other generated scenarios.

As an example, each generated scenario can include at least one corresponding well action where simulation results for each of the simulated generated scenarios can include simulated hydrocarbon production results for the well subject to the at least one corresponding well action.

As an example, a method can include specifying and/or creating one or more well actions for a well where an action may be a downhole action for the well. For example, consider a downhole action for the well that alters fluid composition in the well (e.g., as being produced by the well).

As an example, a method can consider a well that includes multiple perforations at multiple measured depths in the well where one or more of a number of generated scenarios includes a corresponding well action that alters at least one of the multiple perforations.

As an example, a method can consider a well that includes borehole equipment where one or more of a number of generated scenarios includes a corresponding well action that alters the borehole equipment.

As an example, a well can include artificial lift equipment or such equipment may be proposed as an intervention. In such an example, one or more of a number of generated scenarios can include a corresponding well action that alters the artificial lift equipment, introduces artificial lift equipment, operates artificial lift equipment, etc.

As an example, a method can include analyzing generated scenarios and, based on the analyzing, selecting a portion of the generated scenarios for instructing a simulator.

As an example, a method can include provisioning computing resources for instantiating at least one instance of a simulator.

As an example, a method can include assessing received simulation results for implementation of one or more well actions for a well, for example, by assessing the impact of the one or more well actions for the well on at least one other well.

As an example, a system can include one or more processors; memory accessible to at least one of the one or more processors; processor-executable instructions stored in the memory and executable to instruct the system to: receive inputs for a well; generate scenarios for the well using the inputs; instruct a simulator to simulate generated scenarios; receive simulation results for at least some of the generated scenarios; and assess the received simulation results for implementation of one or more well actions for the well.

As an example, one or more computer-readable storage media can include processor-executable instructions to instruct a computing system to: receive inputs for a well; generate scenarios for the well using the inputs; instruct a simulator to simulate generated scenarios; receive simulation results for at least some of the generated scenarios; and assess the received simulation results for implementation of one or more well actions for the well.

As an example, an architecture utilized in a system such as, for example, the system 500 may include features of the AZURE architecture (Microsoft Corporation, Redmond, WA). As an example, a cloud portal block can include one or more features of an AZURE portal that can manage, mediate, etc. access to one or more services, data, connections, networks, devices, etc. As an example, the system 500 may include features of the GOOGLE cloud architecture (Google, Mountain View, CA). As an example, a system may utilize one or more application programming interfaces associated with a cloud platform (e.g., GOOGLE cloud APIs, etc.). As an example, the system 500 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

As an example, a computer program product can include one or more computer-readable storage media that can include processor-executable instructions to instruct a computing system to perform one or more methods and/or one or more portions of a method.

Figure 27:
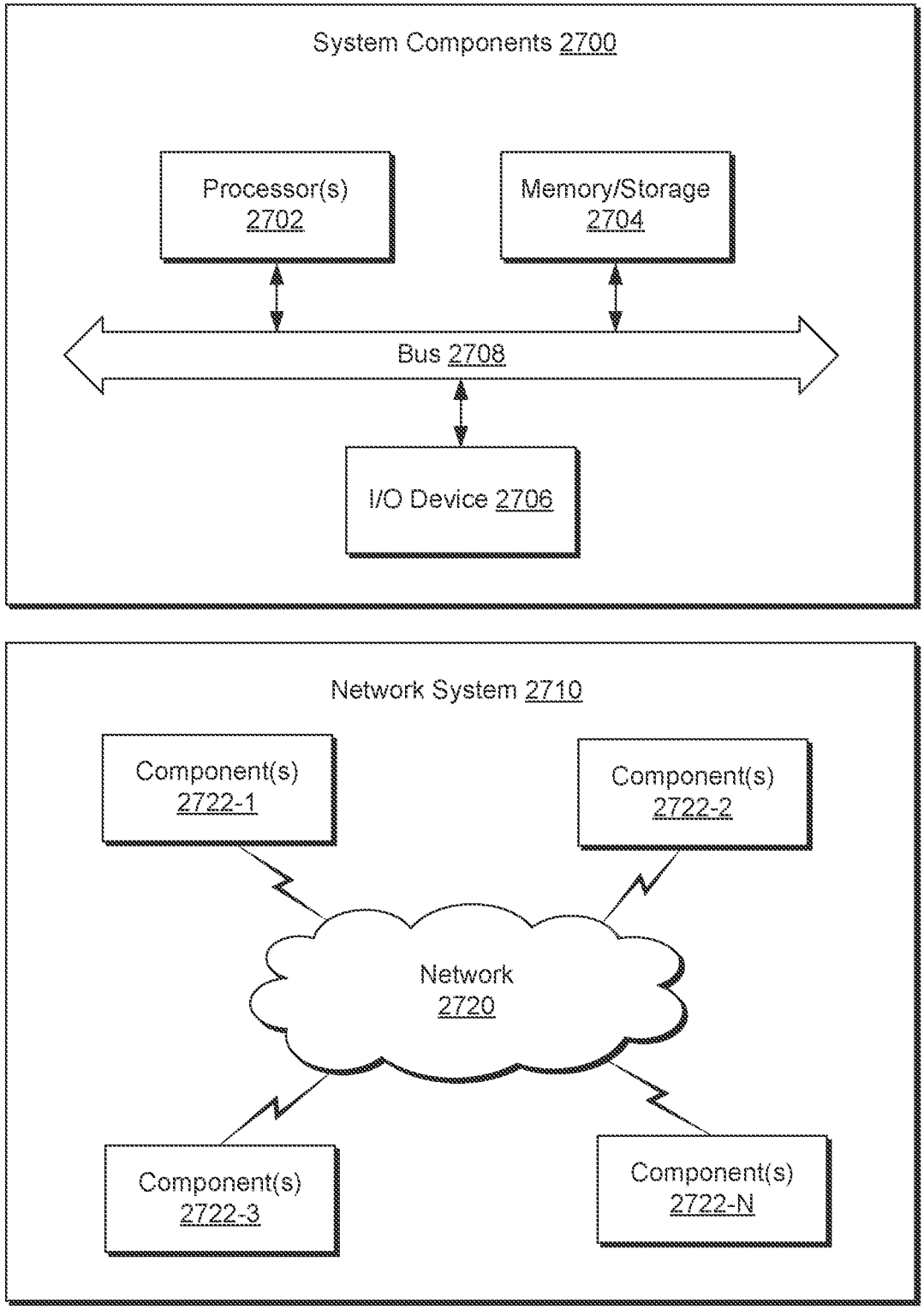
FIG. 27 illustrates example components of a system and a networked system.

FIG. 27 shows components of an example of a computing system 2700 and an example of a networked system 2710 with a network 2720. The system 2700 includes one or more processors 2702, memory and/or storage components 2704, one or more input and/or output devices 2706 and a bus 2708. In an example embodiment, instructions may be stored in one or more computer-readable media (e.g., memory/storage components 2704). Such instructions may be read by one or more processors (e.g., the processor(s) 2702) via a communication bus (e.g., the bus 2708), which may be wired or wireless. The one or more processors may execute such instructions to implement (wholly or in part) one or more attributes (e.g., as part of a method). A user may view output from and interact with a process via an I/O device (e.g., the device 2706). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2710. The network system 2710 includes components 2722-1, 2722-2, 2722-3, . . . 2722-N. For example, the components 2722-1 may include the processor(s) 2702 while the component(s) 2722-3 may include memory accessible by the processor(s) 2702. Further, the component(s) 2722-2 may include an I/O device for display and optionally interaction with a method. A network 2720 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
receiving inputs for a well within a network of wellsite equipment, wherein the inputs are received by a system within the network of wellsite equipment;
generating scenarios for the well using the inputs;
providing a specific scenario for the well from a user;
instructing a simulator to simulate the generated scenarios and the specific scenario, wherein the specific scenario is simulated as a transient simulation with one or more steady states, and wherein the transient simulation comprises ramp-up, terrain-induced slugging, severe slugging, and slug tracking;
receiving simulation results for the specific scenario and at least some of the generated scenarios, wherein the simulation results comprise an activity status of a perforation in the well, an inflow performance relation (IPR) basis, a productivity index, a water rate, an oil rate, a gas rate, a flowing bottom hole pressure, or a Vogel correction;
assessing the received simulation results for implementation of one or more well actions for the well; and
performing the one or more well actions for the well according to the assessed simulation results, wherein performing the one or more well actions comprises generating or transmitting a signal that instructs or causes the one or more well action to occur, wherein the one or more well actions comprise sizing separation equipment and slug catchers to manage liquids associated with the ramp-up, the terrain-induced slugging, the severe slugging, and the slug tracking.

2. The method of claim 1, wherein the assessing the received simulation results comprises ranking the received simulation results based on at least one well performance criterion.

3. The method of claim 1, wherein the generating the scenarios comprises constraining the scenarios based at least in part on one or more iterative simulation convergence criteria.

4. The method of claim 1, wherein the at least one of the one or more well actions corresponds to one of the scenarios.

5. The method of claim 4, further comprising comparing performance of the well after the performing to the simulation results for the one of the scenarios.

6. The method of claim 1, wherein one of the scenarios corresponds to a current operational state of the well and wherein the assessing comprises comparing the simulation results for the current operational state scenario to the simulation results for at least one of the other scenarios.

7. The method of claim 1, wherein each of the generated scenarios comprises at least one corresponding well action.

8. The method of claim 7, wherein the simulation results for each of the simulated generated scenarios comprise simulated hydrocarbon production results for the well subject to the at least one corresponding well action.

9. The method of claim 1, wherein the one or more well actions for the well comprise at least one downhole action for the well.

10. The method of claim 1, wherein the well comprises multiple perforations at multiple measured depths in the well, and wherein one or more of the generated scenarios comprises a corresponding well action that alters at least one of the multiple perforations.

11. The method of claim 1, wherein the well comprises borehole equipment and wherein one or more of the generated scenarios comprises a corresponding well action that alters the borehole equipment.

12. The method of claim 1, wherein the well comprises artificial lift equipment and wherein one or more of the generated scenarios comprises a corresponding well action that alters the artificial lift equipment.

13. The method of claim 1, comprising analyzing the generated scenarios and, based on the analyzing, selecting a portion of the generated scenarios for instructing the simulator.

14. The method of claim 1, wherein the instructing the simulator comprises provisioning computing resources for instantiating at least one instance of the simulator.

15. The method of claim 1, wherein the assessing the received simulation results for implementation of the one or more well actions for the well comprises assessing the impact of the one or more well actions for the well on at least one other well.

16. The method of claim 1, wherein the simulation results comprise the activity status of the perforation in the well, the inflow performance relation (IPR) basis, the productivity index, the water rate, the oil rate, the gas rate, the flowing bottom hole pressure, and the Vogel correction.

17. The method of claim 1, wherein the assessing the received simulation results considers skin effects on a horizontal section of the well and a tubing or casing size in the well.

18. A system comprising:
one or more processors;
memory accessible to at least one of the one or more processors;
processor-executable instructions stored in the memory and executable to instruct the system to:
receive inputs for a well within a network of wellsite equipment, wherein the inputs are received by a system within the network of wellsite equipment;
generate scenarios for the well using the inputs;
providing a specific scenario for the well from a user;
instruct a simulator to simulate the generated scenarios and the specific scenario, wherein the specific scenario is simulated as a transient simulation with one or more steady states, and wherein the transient simulation comprises ramp-up, terrain-induced slugging, severe slugging, and slug tracking;
receive simulation results for the specific scenario and at least some of the generated scenarios, wherein the simulation results comprise an activity status of a perforation in the well, an inflow performance relation (IPR) basis, a productivity index, a water rate, an oil rate, a gas rate, a flowing bottom hole pressure, or a Vogel correction;
assess the received simulation results for implementation of one or more well actions for the well; and
perform the one or more well actions for the well according to the assessed simulation results, wherein performing the one or more well actions comprises generating or transmitting a signal that instructs or causes the one or more well action to occur, wherein the one or more well actions comprise sizing separation equipment and slug catchers to manage liquids associated with the ramp-up, the terrain-induced slugging, the severe slugging, and the slug tracking.

19. A non-transitory computer readable medium having computer-executable instructions to instruct a computing system to:

receive inputs for a well within a network of wellsite equipment, wherein the inputs are received by a system within the network of wellsite equipment;

generate scenarios for the well using the inputs;

providing a specific scenario for the well from a user;

instruct a simulator to simulate the generated scenarios and the specific scenario, wherein the specific scenario is simulated as a transient simulation with one or more steady states, and wherein the transient simulation comprises ramp-up, terrain-induced slugging, severe slugging, and slug tracking;

receive simulation results for the specific scenario and at least some of the generated scenarios, wherein the simulation results comprise an activity status of the perforation in the well, an inflow performance relation (IPR) basis, a productivity index, a water rate, an oil rate, a gas rate, a flowing bottom hole pressure, or a Vogel correction;

assess the received simulation results for implementation of one or more well actions for the well; and perform the one or more well actions for the well according to the assessed simulation results, wherein performing the one or more well actions comprises generating or transmitting a signal that instructs or causes the one or more well action to occur, wherein the one or more well actions comprise sizing separation equipment and slug catchers to manage liquids associated with the ramp-up, the terrain-induced slugging, the severe slugging, and the slug tracking.

20. A method comprising:

receiving inputs for a well within a network of wellsite equipment, wherein the inputs are received by a system within the network of wellsite equipment;

generating scenarios for the well using the inputs;

reviewing at least one of the generated scenarios;

instructing a simulator to simulate generated scenarios, wherein the generated scenario is simulated as a transient simulation with one or more steady states, and wherein the transient simulation comprises ramp-up, terrain-induced slugging, severe slugging, and slug tracking;

receiving simulation results for at least some of the generated scenarios, wherein the simulation results comprise an activity status of a perforation in the well, an inflow performance relation (IPR) basis, a productivity index, a water rate, an oil rate, a gas rate, a flowing bottom hole pressure, or a Vogel correction;

assessing the received simulation results for implementation of one or more well actions for the well; and performing the one or more well actions for the well according to the assessed simulation results, wherein performing the one or more well actions comprises generating or transmitting a signal that instructs or causes the one or more well action to occur, wherein the one or more well actions comprise sizing separation equipment and slug catchers to manage liquids associated with the ramp-up, the terrain-induced slugging, the severe slugging, and the slug tracking, wherein reviewing at least one of the generated scenarios comprises revising, substituting, or deleting at least one of the generated scenarios.

* * * * *